United States Patent
Seo et al.

(10) Patent No.: US 9,913,232 B2
(45) Date of Patent: Mar. 6, 2018

(54) METHOD FOR RECEIVING SYNCHRONIZATION INFORMATION FOR DIRECT COMMUNICATION BETWEEN USER EQUIPMENT AND APPARATUS FOR SAME

(71) Applicant: LG Electronics Inc., Seoul (KR)

(72) Inventors: Hanbyul Seo, Seoul (KR); Seungmin Lee, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/774,323

(22) PCT Filed: Mar. 11, 2014

(86) PCT No.: PCT/KR2014/001989
§ 371 (c)(1),
(2) Date: Sep. 10, 2015

(87) PCT Pub. No.: WO2014/142505
PCT Pub. Date: Sep. 18, 2014

(65) Prior Publication Data
US 2016/0029333 A1    Jan. 28, 2016

Related U.S. Application Data

(60) Provisional application No. 61/776,769, filed on Mar. 11, 2013, provisional application No. 61/815,739, (Continued)

(51) Int. Cl.
*H04W 4/00* (2009.01)
*H04W 56/00* (2009.01)
(Continued)

(52) U.S. Cl.
CPC ......... *H04W 56/0015* (2013.01); *H04J 11/00* (2013.01); *H04L 27/2655* (2013.01);
(Continued)

(58) Field of Classification Search
CPC ......... H04W 56/0015; H04W 56/0025; H04W 72/0446; H04W 76/023; H04W 56/002; H04W 88/02; H04L 27/2655; H04J 11/00
(Continued)

(56) References Cited

U.S. PATENT DOCUMENTS 9,167,613 B2 * 10/2015 Kwon ................. H04W 76/023
9,232,503 B2 *  1/2016 He .................... H04W 72/0406
(Continued)

FOREIGN PATENT DOCUMENTS

CN    102783211 A    11/2012
EP     2725856 A1     4/2014
(Continued)

OTHER PUBLICATIONS

U.S. Appl. No. 61/674,653, filed Jul. 23, 2012.*
(Continued)

*Primary Examiner* — Chuong T Ho
(74) *Attorney, Agent, or Firm* — Dentons US LLP

(57) ABSTRACT

Disclosed is a method by which first user equipment receives synchronization information for a Device-to-Device (D2D) link at a user equipment (UE) in a wireless communication system. Specifically, the method comprises: receiving configuration information for synchronization from serving cell; and acquiring information on reference cell for synchronization of the D2D link based on the configuration information; and acquiring a synchronization resource based on the information on reference cell, wherein the information on reference cell comprises an identifier of the reference cell.

8 Claims, 17 Drawing Sheets

Related U.S. Application Data filed on Apr. 25, 2013, provisional application No. 61/836,142, filed on Jun. 17, 2013, provisional application No. 61/882,601, filed on Sep. 25, 2013, provisional application No. 61/936,290, filed on May 5, 2014.

(51) Int. Cl.
*H04J 11/00* (2006.01)
*H04W 76/02* (2009.01)
*H04L 27/26* (2006.01)
*H04W 72/04* (2009.01)
*H04W 88/02* (2009.01)

(52) U.S. Cl.
CPC ..... *H04W 56/002* (2013.01); *H04W 56/0025* (2013.01); *H04W 72/0446* (2013.01); *H04W 76/023* (2013.01); *H04W 88/02* (2013.01)

(58) Field of Classification Search
USPC .................................. 370/328, 329, 330, 350
See application file for complete search history.

(56) References Cited

U.S. PATENT DOCUMENTS

| | | | |
|---|---|---|---|
| 9,491,759 B2 * | 11/2016 | Hwang | H04W 72/0453 |
| 2009/0082002 A1 | 3/2009 | Kim et al. | |
| 2010/0165882 A1 | 7/2010 | Palanki et al. | |
| 2012/0190373 A1 * | 7/2012 | Tenny | H04W 56/0015 |
| | | | 455/447 |
| 2012/0309405 A1 * | 12/2012 | Parkvall | H04W 48/08 |
| | | | 455/452.1 |
| 2013/0083779 A1 * | 4/2013 | Ahn | H04W 72/04 |
| | | | 370/336 |
| 2013/0124934 A1 * | 5/2013 | Jones | G01R 31/31854 |
| | | | 714/727 |
| 2013/0156000 A1 * | 6/2013 | Hwang | H04W 72/0453 |
| | | | 370/330 |
| 2013/0250771 A1 * | 9/2013 | Yu | H04W 76/023 |
| | | | 370/241 |
| 2014/0064263 A1 * | 3/2014 | Cheng | H04W 8/005 |
| | | | 370/350 |
| 2014/0177468 A1 * | 6/2014 | Kazmi | H04L 41/0816 |
| | | | 370/254 |
| 2015/0181546 A1 * | 6/2015 | Freda | H04W 56/0015 |
| | | | 370/336 |
| 2015/0350853 A1 * | 12/2015 | Parkvall | H04W 48/08 |
| | | | 370/254 |
| 2016/0044666 A1 * | 2/2016 | Shin | H04W 76/023 |
| | | | 370/336 |
| 2016/0270012 A1 * | 9/2016 | Chen | H04W 76/02 |

FOREIGN PATENT DOCUMENTS

| | | |
|---|---|---|
| JP | 2012039451 | 2/2012 |
| KR | 1020110033079 | 3/2011 |
| KR | 101232356 | 2/2013 |
| RU | 2464711 C2 | 10/2012 |
| WO | 2010035100 A1 | 4/2010 |
| WO | 2011037413 A2 | 3/2011 |
| WO | 2011109027 | 9/2011 |
| WO | 2012020705 A1 | 2/2012 |
| WO | 2013002206 A1 | 1/2013 |
| WO | 2013002688 | 1/2013 |

OTHER PUBLICATIONS

International Search Report from PCT/KR2014/001989, dated Jun. 20, 2014.
Written Opinion of the ISA from PCT/KR2014/001989, dated Jun. 20, 2014.

* cited by examiner

FIG. 5
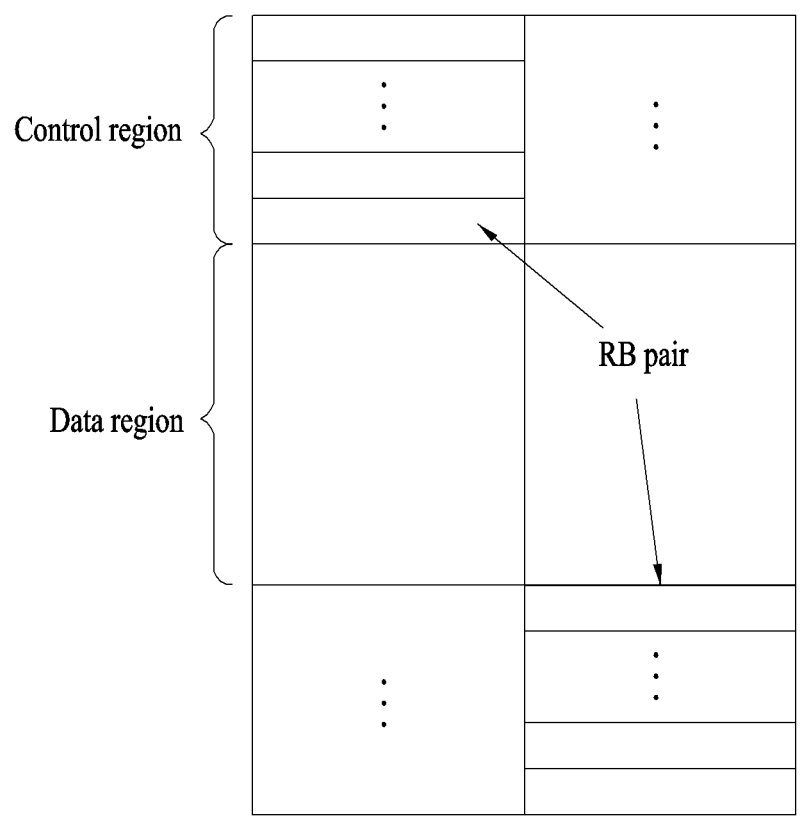
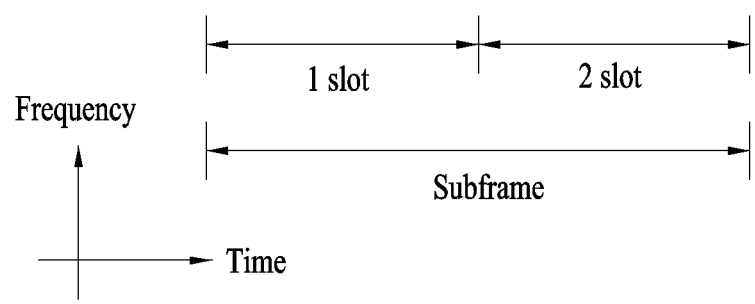

FIG. 6
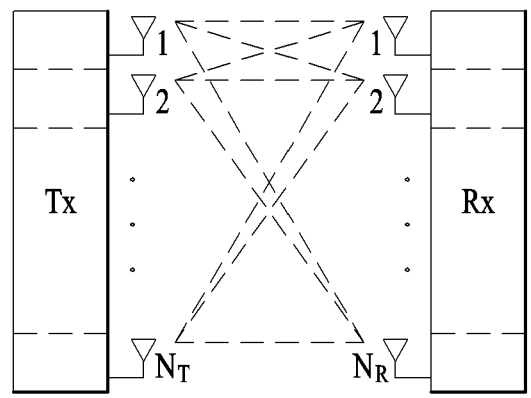
(a)
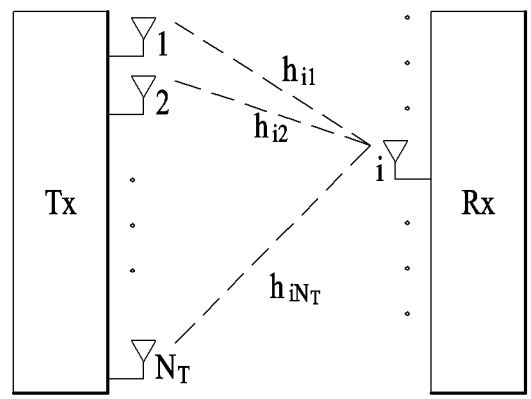
(b)

FIG. 7
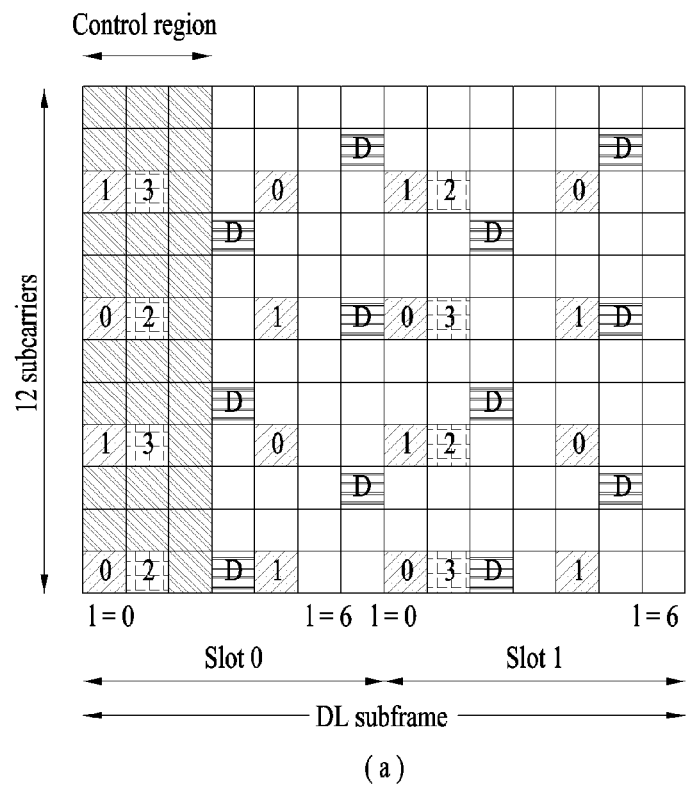
(a)
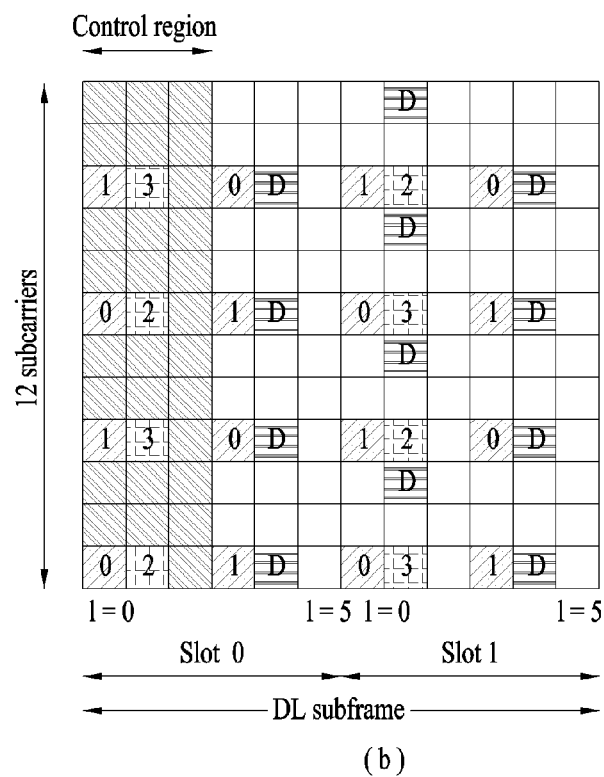
(b)

METHOD FOR RECEIVING SYNCHRONIZATION INFORMATION FOR DIRECT COMMUNICATION BETWEEN USER EQUIPMENT AND APPARATUS FOR SAME

This application is a 35 USC § 371 National Stage entry of International Application No. PCT/KR2014/001989 filed on Mar. 11, 2014, and claims priority to U.S. Provisional Application Nos. 61/776,769 filed on Mar. 11, 2013; 61/815,739 filed on Apr. 25, 2013; 61/836,142 filed on Jun. 17, 2013; 61/882,601 filed on Sep. 25, 2013 and 61/936,290 filed on Feb. 5, 2014, all of which are hereby incorporated by reference in their entireties as if fully set forth herein.

TECHNICAL FIELD

The present invention relates to a wireless communication system. More particularly, the present invention relates to a method for receiving synchronization information for direct communication between terminals in a wireless communication system and an apparatus for the same.

BACKGROUND ART

As an example of a mobile communication system to which the present invention is applicable, a 3rd Generation Partnership Project (3GPP) Long Term Evolution (LTE) communication system will be briefly described.

FIG. 1 is a schematic diagram showing a network structure of an Evolved Universal Mobile Telecommunications System (E-UMTS) as an example of a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other wireless access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

In view of the above discussion, an object of the present invention is to provide a method for receiving synchronization information for direct communication between terminals in a wireless communication system and an apparatus for the same.

Technical Solution

The object of the present invention can be achieved by providing a method for receiving, by a first terminal, synchronization information for direct communication between terminals in a wireless communication system, including receiving information on a reference cell from a serving cell, receiving a synchronization reference signal from the reference cell, and acquiring synchronization for the direct communication based on the synchronization reference signal, wherein the reference cell includes at least one of cells included in a cell cluster, wherein the cell cluster includes at least one of a plurality of neighboring cells neighboring the reference cell and the serving cell. Preferably, the method further includes transmitting or receiving a signal to or from a counterpart terminal based on the acquired synchronization using the direct communication.

Preferably, the reference cell includes a plurality of cells. Accordingly, the method may further include dividing resources for the direct communication into a plurality of partitions, wherein synchronization for a first resource partition of the plurality of partitions is acquired from a first reference cell of the reference cell, wherein synchronization for a second resource partition of the plurality of partitions is acquired from a second reference cell of the reference cell. Alternatively, the method may further include receiving information on a parameter from the serving cell, wherein, when a signal containing a first parameter is transmitted or received to or from a counterpart terminal using the direct communication, the signal is transmitted or received using synchronization acquired from a first reference cell operatively connected with the first parameter, wherein, when a signal containing a second parameter is transmitted or received to or from the counterpart terminal using the direct communication, the signal is transmitted or received using synchronization acquired from a second reference cell operatively connected with the second parameter.

Preferably, the information on the reference cell includes at least one of a cell identity (ID) of the reference cell and a list of the cells included in the cell cluster. Herein, the receiving of the synchronization reference signal from the reference cell is performed when the serving cell is included in the list of the cells.

Additionally, the method may further include receiving, from the serving cell, information on a resource region, the synchronization reference signal being transmitted in the resource region, wherein a transmit power of at least one of the neighboring cells is reduced in the resource region.

The method may further include reporting a result of the acquired synchronization to the serving cell.

According to another aspect of the present invention, provided herein is a terminal in a wireless communication system, including a transception module configured to receive information on a reference cell from a serving cell and to receive a synchronization reference signal from the reference cell, and a processor configured to acquiring synchronization for direct communication between terminals based on the synchronization reference signal, wherein the reference cell includes at least one of cells included in a cell cluster, wherein the cell cluster includes at least one of a plurality of neighboring cells neighboring the reference cell and the serving cell.

Preferably, the reference cell includes a plurality of cells. Accordingly, the processor may be configured to divide resources for the direct communication into a plurality of partitions, wherein synchronization for a first resource partition of the plurality of partitions is acquired from a first reference cell of the reference cell, wherein synchronization for a second resource partition of the plurality of partitions is acquired from a second reference cell of the reference cell. Alternatively, the processor may be configured to receive information on a parameter from the serving cell, wherein, when a signal containing a first parameter is transmitted or received to or from a counterpart terminal using the direct communication, the signal is transmitted or received using synchronization acquired from a first reference cell operatively connected with the first parameter, wherein, when a signal containing a second parameter is transmitted or received to or from the counterpart terminal using the direct communication, the signal is transmitted or received using synchronization acquired from a second reference cell operatively connected with the second parameter.

Preferably, the information on the reference cell includes at least one of a cell identity (ID) of the reference cell and a list of the cells included in the cell cluster. Accordingly, the transception module may receive the synchronization reference signal from the reference cell when the serving cell is included in the list of the cells.

The aspects of the present invention may include the following details in common.

The first resource partition may be operatively connected with a cell identity (ID) of the first reference cell, wherein the second resource partition may be operatively connected with a cell ID of the second reference.

The parameter may include at least one of a preamble sequence and a demodulation reference signal sequence.

The synchronization reference signal ma include at least one of a primary synchronization signal, a secondary synchronization signal, a cell-specific reference signal (CRS), a tracking reference signal (RS) and a channel state information-reference signal (CSI-RS).

The above general description and the following detailed description of the present invention are exemplarily given to supplement the recitations in the claims.

Advantageous Effects

According to an embodiment of the present invention, when direct communication between UEs is performed, synchronization between UEs connecting to different base stations may be acquired.

Resources may be effectively used by acquired different synchronization between UEs connecting to different base stations.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 is a diagram illustrating the structure of an uplink subframe;

FIG. 6 illustrates configuration of a wireless communication system having multiple antennas (MIMO);

FIG. 7 illustrates a downlink reference signal;

BEST MODE

Figure 1:
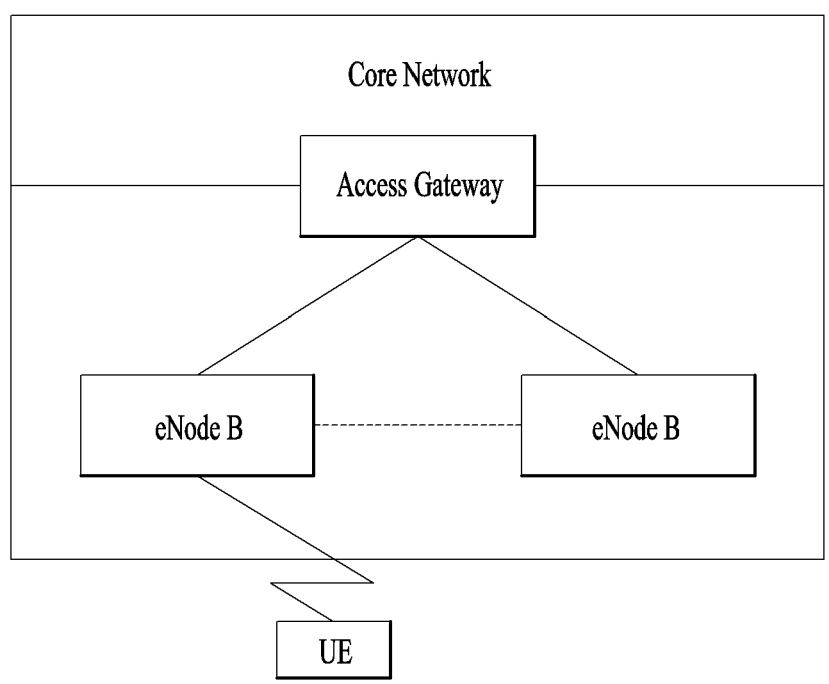
FIG. 1 is a schematic diagram illustrating the structure of a wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

Figure 2:
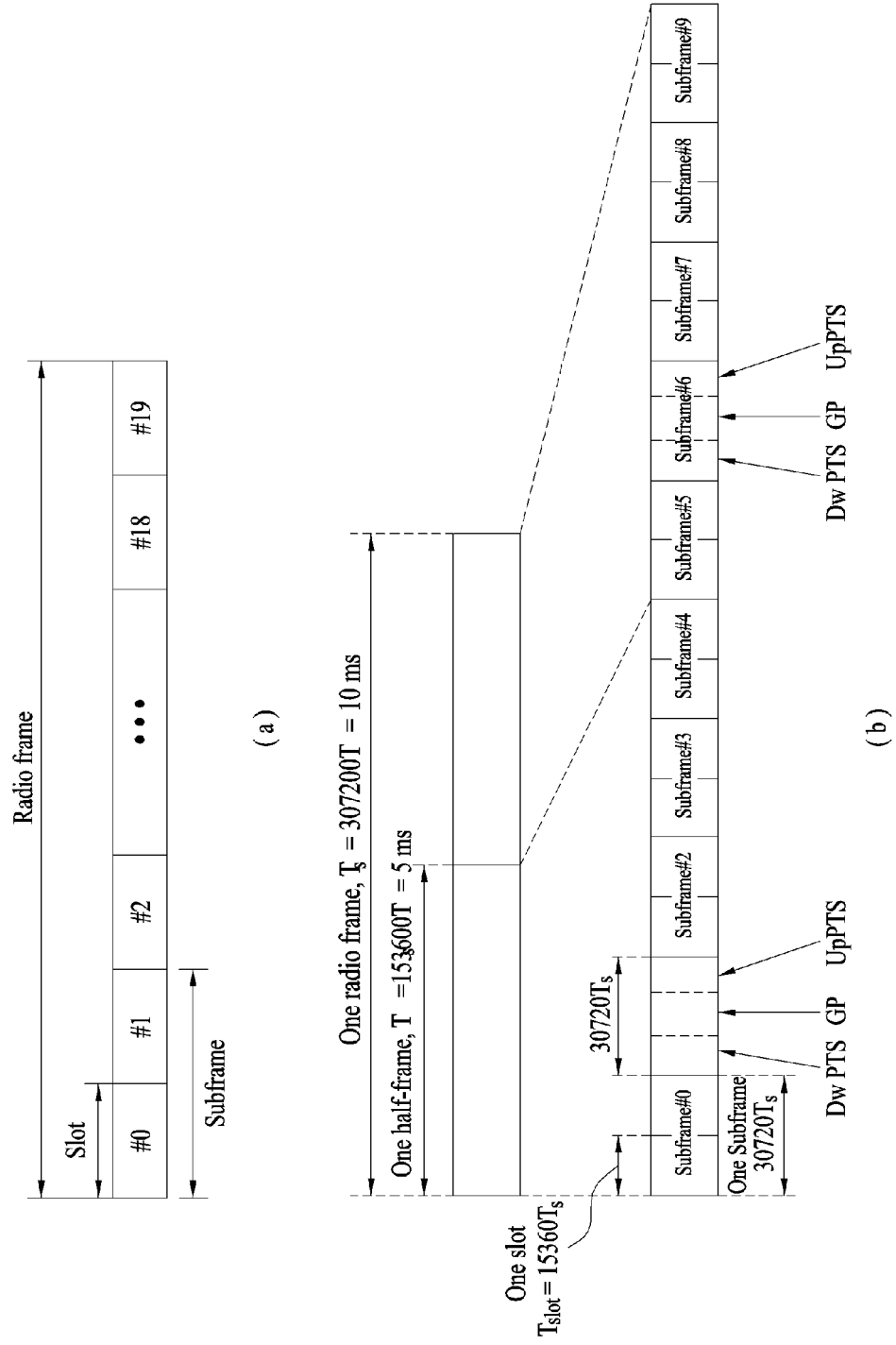
FIG. 2 illustrates a radio frame structure in 3GPP LTE.

The structure of a radio frame of 3GPP LTE system will be described with reference to FIG. 2.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. A radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

FIG. 2(b) A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization of a UE at an eNB. The GP is a period between an uplink and a downlink, which eliminates uplink interference caused by multipath delay of a downlink signal. One subframe includes two slots irrespective of the type of a radio frame.

In the LTE TDD system, uplink/downlink subframe configurations (UL/DL configurations) are given as shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

Supported uplink/downlink subframes are shown in Table 1. For subframes of a radio frame, "D" denotes a subframe reserved for downlink transmission, "U" denotes a subframe reserved for uplink transmission, "S" denotes a special subframe including a downlink pilot time slot (DwPTS), a guard period (GP) and an uplink pilot slot (UpPTS).

The current 3GPP standard document defines configuration of the special subframe as shown in Table 2 below. Table 2 shows DwPTS and UpPTS given when TS=1/(15000*2048), and the other region is configured as a GP.

Figure 3:
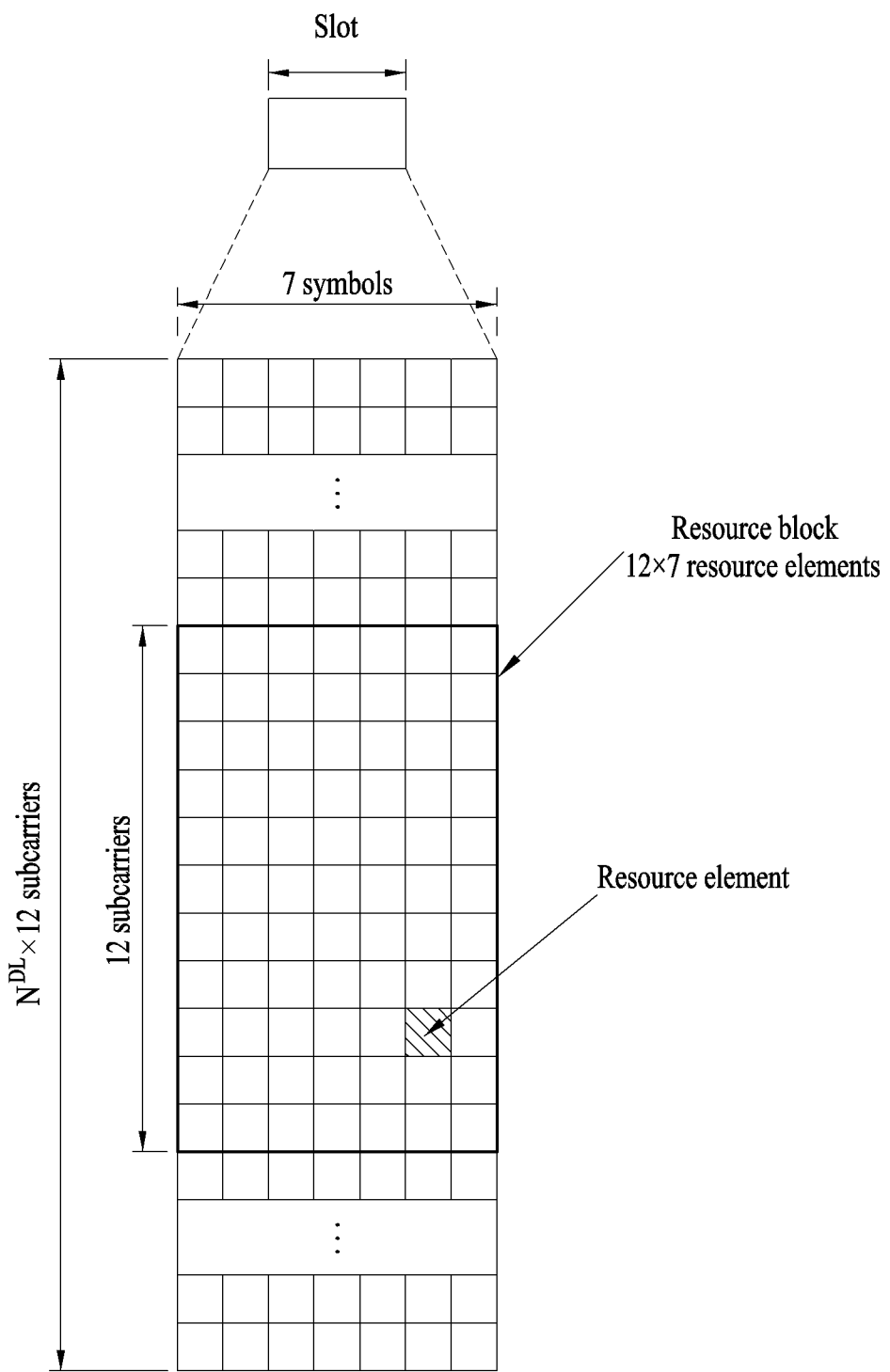
FIG. 3 is a diagram illustrating a resource grid of a downlink slot.

FIG. 3 is a diagram illustrating a resource grid of a downlink slot. A downlink slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a downlink transmission bandwidth. An uplink slot may have the same structure as a downlink slot.

Figure 4:
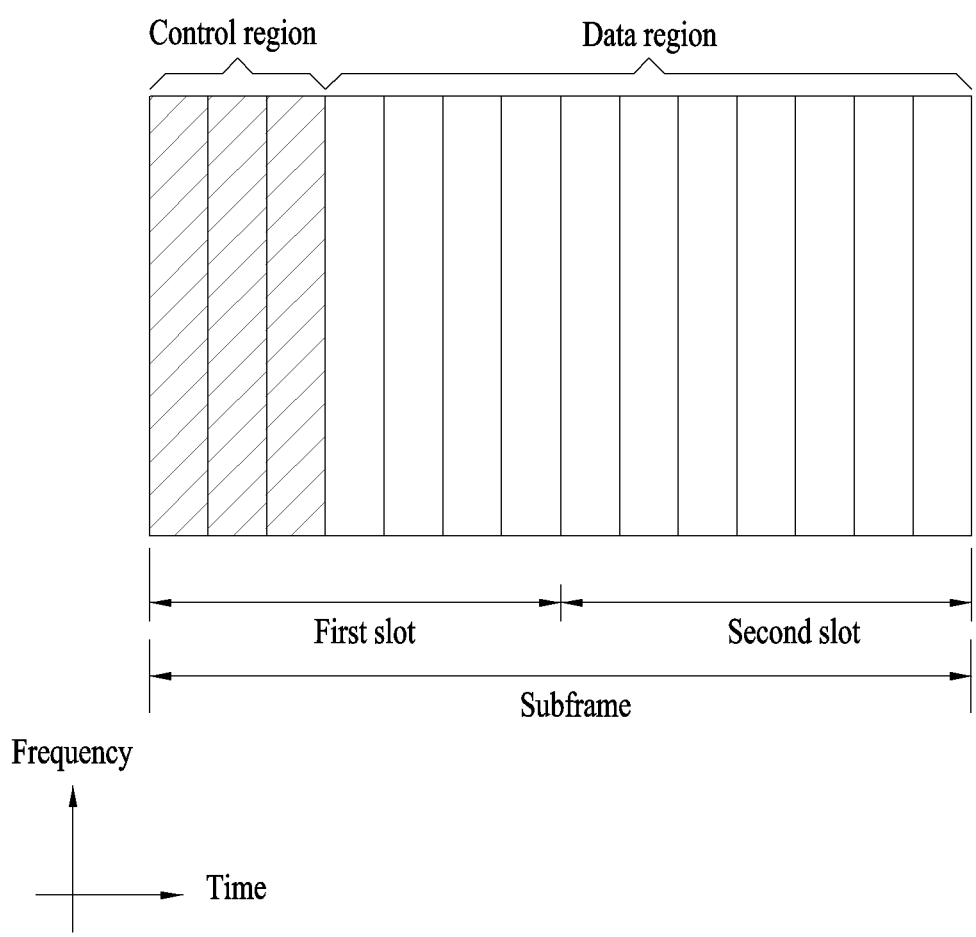
FIG. 4 is a diagram illustrating the structure of a downlink subframe.

FIG. 4 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

The illustrated radio frame structures are merely examples, and various modifications may be made to the number of subframes included in a radio frame, the number of slots included in a subframe, or the number of symbols included in a slot.

of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

FIG. 5 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multi-Antenna (MIMO) System

Hereinafter, a MIMO system will be described. MIMO (Multiple-Input Multiple-Output) is a scheme of using a plurality of transmit antennas and a plurality of receive antennas. With this scheme, efficiency of transmission and reception of data may be enhanced. That is, when the transmission entity or reception entity of the wireless communication system uses a plurality of antennas, transmission capacity and performance may be enhanced. In this specification, MIMO may be referred to as 'multi-antenna'.

In the multi-antenna technology, reception of one whole message does not depend on a single antenna path. Instead, data fragments received though several antennas are collected and merged into whole data. With the multi-antenna technology, system coverage may be expanded in a cell region of a specific size with a data transfer rate improved or a specific data transfer rate ensured. In addition, this technology may be widely used by, for example, a mobile communication terminal and a relay. In conventional cases, a single transmit antenna and a single receive antenna have been used. With the multi-antenna technology, limitation on the transfer rate in mobile communication based on the conventional technology using a single antenna may be overcome.

At the same time, data transmission efficiency may be improved. Among various technologies, the MIMO technology may greatly enhance communication capacity and transmission/reception performance without additional allocation of frequencies or additional increase of power. Due to this advantage, the MIMO technology is drawing attention from a majority of companies and developers.

FIG. 6 illustrates configuration of a wireless communication system having multiple antennas (MIMO).

As shown in FIG. 6, $N_T$ transmit (Tx) antennas are installed at the transmission entity, and $N_R$ receive (Rx) antennas are installed at the reception entity. If both the transmission entity and the reception entity use a plurality of antennas as illustrated in the figure, a greater theoretical channel transmission capacity is obtained than when only one of the transmission entity and the reception entity uses a plurality of antennas. The channel transmission capacity increases in proportion to the number of antennas. Accordingly, the transfer rate and the frequency efficiency are enhanced along with increase of the channel transmission capacity. When the maximum transfer rate obtained using one antenna is Ro, the transfer rate obtained using multiple antennas may theoretically increase by the maximum transfer rate Ro multiplied by the rate of rate increase Ri given by Equation 1 below. Herein, Ri is the smaller one of $N_T$ and $N_R$.

$$R_i = \min(N_T, N_R) R_i = \min(N_T, N_R) \quad \text{[Equation 1]}$$

For example, a MIMO communication system that uses four Tx antennas and four Rx antennas may theoretically acquire four times the transfer rate acquired by a single antenna system. After the above-mentioned theoretical increase in capacity of the MIMO system was demonstrated in the mid-1990s, research has been actively conducted into a variety of technologies which may substantially increase data transfer rate, and some of the technologies have been reflected in a variety of wireless communication standards such as, for example, the third-generation mobile communication and the next-generation wireless LAN.

A variety of MIMO-associated technologies have been actively researched. For example, research into information theory related to MIMO communication capacity in various channel environments and multi-access environments, research into a radio frequency (RF) channel measurement and modeling of the MIMO system, and research into space-time signal processing technology have been actively conducted.

Hereinafter, mathematical modeling of a communication method for use in the MIMO system will be described in detail. As shown in FIG. 6, It is assumed that the system includes $N_T$ Tx antennas and $N_R$ Rx antennas In the case of a transmission signal, the maximum number of pieces of transmittable information is $N_T$ under the condition that $N_T$ Tx antennas are used, and thus the transmission information may be represented by a vector of Equation 2 given below.

$$s = [s_1, s_2, \ldots, s_{N_T}]^T \quad \text{[Equation 2]}$$

For the respective pieces of transmission information $s_1, s_2, \ldots, s_{N_T}$, different transmit powers may be used. In this case, when the respective transmit powers are denoted by $P_1, P_2, \ldots, P_{N_T}$, the pieces of transmission information having adjusted transmit powers may be expressed by Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{S}$ may be expressed by Equation 4 below using a diagonal matrix P of transmit powers.

$$\hat{s} = \begin{bmatrix} P_1 & \cdots & 0 \\ \vdots & \ddots & \vdots \\ 0 & \cdots & P_{N_T} \end{bmatrix} \begin{bmatrix} s_1 \\ \vdots \\ s_{N_T} \end{bmatrix} = Ps \quad \text{[Equation 4]}$$

$$\hat{s} = \begin{bmatrix} p_1 & & & 0 \\ & p_2 & & \\ & & \ddots & \\ 0 & & & p_{N_T} \end{bmatrix} \begin{bmatrix} s_1 \\ s_2 \\ \vdots \\ s_{N_T} \end{bmatrix} = Ps$$

Suppose that a weight matrix W is applied to the information vector Ŝ having adjusted transmit powers, and thus $N_T$ transmitted signals $x_1, x_2, \ldots, x_{NT}$ to be actually transmitted are configured. In this case, the weight matrix W serves to properly distribute transmission information to individual antennas according to the transmission channel situation. The transmitted signals x1, x2, . . . , xNT may be represented by Equation 5 below using vector X $$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ denotes a weight corresponding to the i-th Tx antenna and the j-th information. W is called a weight matrix or a precoding matrix.

This method may be viewed in a different way in terms of the type of the MIMO technology. If one stream is transmitted via several antennas, the method may be viewed as a space diversity scheme. In this case, the elements of the information vector Ŝ have the same value. If multiple streams are transmitted via multiple antennas, the method may be viewed as a spatial multiplexing scheme. In this case, the elements of the information vector Ŝ have different values. Of course, a hybrid method that combines space diversity spatial multiplexing is also possible. That is, one signal is transmitted via three transmit antennas according to the space diversity scheme, and the other signals are transmitted according to the spatial multiplexing scheme.

When NR Rx antennas are used, received signals y1, y2, . . . , yNR of individual antennas may be expressed by a vector of the following equation.

$$y=[y_1,y_2,\ldots,y_{N_R}]^T \quad \text{[Equation 6]}$$

When channel modeling is performed in the MIMO wireless communication system, individual channels may be distinguished from each other by Tx/Rx antenna indexes. Suppose that a channel running from a Tx antenna j to an Rx antenna i is denoted by $h_{ij}$. In denoting indexes for $h_{ij}$, it should be noted that, an Rx antenna index comes first and the Tx antenna index comes later.

FIG. 6(b) shows channels from $N_T$ Tx antennas to Rx antenna i. The channels may be grouped and expressed in the form of a vector or matrix. In FIG. 6(b), the channels reacing the Rx antenna i from the $N_T$ Tx antennas may be represented by the following equation.

$$h_i^T=[h_{i1},h_{i2},\ldots,h_{iN_T}] \quad \text{[Equation 7]}$$

All channels reaching $N_R$ Rx antennas from the $N_T$ Tx antennas may be expressed by the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

In reality, additive white Gaussian noises (AWGNs) are added to the channels after application of channel matrix H. The AWGNs $n_1, n_2, \ldots, n_{NR}$ added to $N_R$ Rx antennas may be expressed by the following equation.

$$n=[n_1,n_2,\ldots,n_{N_R}]^T \quad \text{[Equation 9]}$$

Received signals according to the mathematical modeling described above may be expressed by the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of channel matrix H indicating a channel condition is determined by the number of Tx/Rx antennas. In the channel matrix H, the number of rows is equal to the number of Rx antennas $N_R$, and the number of columns is equal to the number of Tx antennas $N_T$. That is, the channel matrix H is an $N_R \times N_T$ matrix.

A rank of a matrix is defined as the smaller one of the number of independent rows and the number of independent columns of the matrix. Therefore, the matrix rank may not be higher than the number of rows or columns. The rank of channel matrix H may be restricted as expressed by the following equation.

$$\text{rank}(H) \leq \min(N_T, N_R) \quad \text{[Equation 11]}$$

The rank may be defined as the number of non-zero Eigen values obtained when Eigen value decomposition is performed on the matrix. Similarly, the rank may be defined as the number of non-zero singular values obtained when singular value decomposition is performed on the matrix. Accordingly, the rank of a channel matrix physically means the maximum number of pieces of information that is transmittable over a given channel.

Measurement by UE

In some cases, a UE needs to perform downlink measurement. For example, in order for a BS to support a handover operation of the UE or an inter-cell interference coordination, the UE needs to perform DL measurement and to report a result of the DL measurement to the BS. The DL measurement involves various measurement schemes such as, for example, measurement for Radio Link Monitoring (RLM), measurement for channel state information (CSI) reporting and radio resource management (RRM) measurement and various measurement values.

The RLM measurement may include, for example, DL measurement that is used in the process of detecting radio link failure (RLF) and discovering a new radio link. The measurement for the CSI reporting may include, for example, measurement of a downlink channel quality performed by the UE to select/calculate and report an appropriate rank indicator, an appropriate precoding matrix indicator and an appropriate channel quality indicator. The RRM measurement may include, for example, measurement for determining presence or absence of handover of the UE.

The RRM measurement may include measurements of Reference Signal Received Power (RSRP), Reference Signal Received Quality (RSRQ), Received Signal Strength Indicator (RSSI) and the like.

RSRP is defined as a linear average of powers of a resource element that carries a cell-specific RS (CRS) in a measured frequency bandwidth. A UE may determine RSRP by detecting a CRS transmitted by being mapped onto a specific resource element. For RSRP calculation, a CRS (R0) for an antenna port 0 may be basically used. If the UE is capable of reliably detecting a CRS (R1) for an antenna port 1, RSRP may be determined using R1 in addition to R0. For details of the cell-specific RS, the standard document (e.g., 3GPP TS36.211) and a description give below with reference to FIG. 7 may be referenced.

RSRQ is defined as a value obtained by dividing a value obtained by multiplying the RSRP by the number N of resource blocks in a measured frequency bandwidth by 'E-UTRA carrier RSSI' (i.e., RSRQ=N×RSRP/(E-UTRA carrier RSSI)). The numerator (N×RSRP) and the denominator (E-UTRA carrier RSSI) are measured for the same resource block set.

The 'E-UTRA carrier RSSI' includes a linear average of total reception power measured on signals received from all sources including common-channel serving and non-serving cells, neighboring channel interference and thermal noise, by a UE for only OFDM symbols including a reference symbol for antenna port 0 (i.e., CRS for antenna port 0) over N resource blocks in a measurement bandwidth.

'UTRA FDD carrier RSSI' is defined as a received wideband power including noise generated from a receiver and thermal noise in a bandwidth defined by a receiver pulse forming filter.

'UTRA TDD carrier RSSI' is defined as a received wideband power including noise generated from a receiver and thermal noise in a bandwidth defined by a receiver pulse forming filter within a specific time slot.

The standard document (e.g., 3GPP TS36.214) may be referenced for the description of the DL channel measurement other than the description given above, and detailed description of the DL channel measurement shall be omitted for clarity. Yet, it is apparent that the details of the DL channel measurement disclosed in the standard are applicable to DL channel measurements employed in various embodiments of the present invention described below.

Reference Signal; RS

Hereinafter, a reference signal (RS) will be described.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. In the case in which the transmitter or the receiver uses multiple antennas so as to increase capacity or improve performance, in order to accurately receive the signal, the channel statuses between the transmission antennas and the reception antennas should be acquired from the respective RSs of the transmission antennas.

In a wireless communication system, RSs may be largely divided into two RSs according to their purposes: a RS for acquiring channel information and an RS used for data demodulation. The former is used for enabling a User Equipment (UE) to acquire downlink channel information, and thus should be transmitted in a wideband. Accordingly, even a UE which does not downlink data in a specific subframe should receive this RS and perform channel measurement. In addition, this RS is also used for measurement for mobility management such as handover or the like.

The latter is an RS which is sent together when a base station (eNB) sends downlink data. The UE may receive this RS so as to perform channel estimation and demodulate the data. This RS should be transmitted in a region in which data is transmitted.

In an LTE system, two downlink RSs are defined for a unicast service. More specifically, there are a common RS (CRS) for measurement associated with handover and channel status information acquisition and a dedicated RS (DRS) used for data demodulation. The CRS may be referred to as a cell-specific RS and the DRS may be referred to as a UE-specific RS.

In an LTE system, the DRS is used only for data demodulation and the CRS is used for channel information acquisition and data demodulation.

The reception side (a UE) may estimate a channel state from CRS and feed back a channel quality-related indicator such as a CQI (Channel Quality Indicator), a PMI (Precoding Matrix Index) and/or an RI (Rank Indicator) to the transmission side (an eNB). Alternatively, an RS related to feedback of channel state information (CSI) such as CQI/PMI/RI may be separately defined as the CSI-RS. The CRS may also be referred to as a cell-specific reference signal. The CRS is transmitted in every subframe over a wideband as a cell-specific reference signal. In addition, the CRS is transmitted based on up to four antenna ports according to the number of Tx antennas of the eNB.

Meanwhile, when demodulation of data on PDSCH is needed, the DRS may be transmitted through a corresponding RE. The UE may receive, from a higher layer, an indication signaling presence or absence of a DRS, and also receive, only if the PDSCH is mapped, an indication signaling that the DRS is valid. The DRS may be referred to as a UE-specific reference signal or a demodulation reference signal (DMRS).

FIG. 7 is a diagram illustrating a pattern of mapping of a CRS and a DRS defined in the legacy 3GPP LTE system (e.g., Release-8) to resource block (RB) pairs. A downlink RB pair, as a unit to which an RS is mapped, may be expressed in a unit of one subframe in the time domain×12 subcarriers in the frequency domain. That is, the length of one RB pair is 14 OFDM symbols for a normal CP (FIG. 7(a)) and 12 OFDM symbols for an extended CP (FIG. 7(b)).

FIG. 7 shows locations of RSs on RB pairs in a system in which the BS supports four transmit antennas. In FIG. 7, resource elements (REs) indicated by "0", "1", "2" and "3" represent the locations of the CRSs for antenna port indexes 0, 1, 2 and 3, respectively. In FIG. 7, REs indicated by "D" represent the locations of the DMRSs.

Hereinafter, CRS will be described in detail.

A CRS is used to estimate a channel of a physical antenna end, and is distributed over the entire band as a reference signal which may be received by all UEs in a cell in common. The CRS may be used for the purpose of acquisition of CSI and data demodulation.

The CRS is defined in various forms according to configuration of antennas on the transmission side (the eNB). The 3GPP LTE (e.g., Release-8) system supports various antenna configurations, and a downlink signal transmission side (the eNB) has three types of antenna configurations including single antenna, 2 Tx antennas and 4 Tx antennas. If the eNB transmits performs single antenna transmission, a reference signal for a single antenna port is deployed. If the eNB performs 2-antenna transmission, reference signals for two antenna ports are deployed according to a time division multiplexing scheme and/or a frequency division multiplexing scheme. That is, the reference signals for two antenna ports may be distinguished from each other by being disposed on different time resources and/or different frequency resources. If the eNB performs 4-antenna transmission, reference signals for four antenna ports are deployed according to the TDM/FDM scheme. Channel information estimated by a downlink signal reception side (a UE) through the CRS maybe used for demodulation of data transmitted using transmission techniques such as single antenna transmission, transmit diversity), closed-loop spatial multiplexing, open-loop spatial multiplexing, and multi-user MIMO (MU-MIMO).

If multiple antennas are supported, a reference signal is transmitted through a certain antenna port on the position of an RE designated according to an RS pattern, and no signal is transmitted on the position of an RE designated for other antenna ports.

The rule by which the CRS is mapped on to RBs is expressed by Equation 12 given below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k is a subcarrier index, l is a symbol index, and p is an antenna port index. $N_{symb}^{DL}$ denotes the number of OFDM symbols of one downlink slot, $N_{RB}^{DL}$ denotes the number of RBs allocated to downlink, $\eta_s$ denotes a slot index, and $N_{ID}^{cell}$ denotes a cell ID. 'mod' denotes modulo operation. The location of a reference signal in the frequency domain depends on the value of $V_{shift}$. Since $V_{shift}$ depends on the cell ID, the location of the reference signal has different frequency shift values for respective cells.

Specifically, in order to improve performance of channel estimation through the CRS, the location of the CRS in the frequency domain may be differently set for respective cells by shifting the location of the CRS. For example, reference signals are positioned every 3 subcarriers, one cell may be disposed on subcarrier 3k, and another cell may be disposed on subcarrier 3k+1. A reference signal for one antenna port is disposed at intervals of 6 REs (i.e., 6 subcarriers) in the frequency domain, and is kept spaced from a reference signal for another antenna port by 3 REs in the frequency domain.

Additionally, power boosting may be applied to the CRS. Power boosting means transmitting a reference signal using high power of an RE other than the RE allocated to the reference signal among REs of one OFDM symbol.

In the time domain, reference signals are disposed at constant intervals, starting from symbol index (1) 0 of each slot. The time interval is differently defined according to the CP length. For normal CP, reference signals are positioned on symbol indexes 0 and 4 of a slot. For extended CP, reference signals are positioned on symbol indexes 0 and 3 of the slot. a reference signal for up to two antenna ports is defined on each OFDM symbol. Accordingly, in the case of 4-Tx antenna transmission, reference signals for antenna ports 0 and 1 are positioned on symbol indexes 0 and 4 of a slot (symbol indexes 0 and 3 for the extended CP), and reference signals for antenna ports 2 and 3 are positioned on symbol index 1 of the slot. The locations of the reference signals for antenna ports 2 and 3 in the frequency domain are switched in the second slot.

In order to support spectral efficiency higher than that of the legacy 3GPP LTE (e.g., Release-8) system, a system having an extended antenna configuration (e.g., LTE-A system) may be designed. The extended antenna configuration may be, for example, 8-Tx antenna configuration. In a system having such extended antenna, it is necessary to support UEs operating in the conventional antenna configuration, namely to support backward compatibility. Accordingly, a reference signal pattern according to the conventional antenna configuration needs to be supported and a new reference signal pattern for an additional antenna configuration needs to be designed. Herein, if a CRS for a new antenna port is added to a system having the conventional antenna configuration, reference signal overhead drastically increases, thereby lowering the data transfer rate. In consideration of this matter, a separate reference signal for CSI measurement (CSI-RS) for a new antenna port may be introduced in the LTE-A (Advanced) system, which is an evolution of 3GPP LTE. The CSI-RS, which a separate reference signal will be described later.

Hereinafter, a detailed description will be given of DRS.

A DRS (or UE-specific reference signal) is a reference signal used for data demodulation. A precoding weight used for a specific UE in performing antenna transmission may be applied to the reference signal. Thereby, once the UE receives the reference signal, the UE may estimate an equivalent channel which is a combination of the precoding weight transmitted through each transmit antenna with a transmission channel.

In the legacy 3GPP LTE system (e.g., Release-8), transmission through up to 4 Tx antennas is supported, and a DRS for rank 1 beamforming is defined. The DRS for rank 1 beamforming may be indicated by a reference signal for antenna port index 5. A rule by which the DRS is mapped onto RBs complies with Equations 13 and 14 given below. Equation 13 is applied to normal CP, and Equation 14 is applied to extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equation 13 and 14, k is a subcarrier index, l is a symbol index, and p is an antenna port index. $N_{SC}^{RB}$, which represents the RB size in the frequency domain, is the number of subcarriers. $\eta P_{RB}$ denotes a physical RB number. $N_{RB}^{PDSCH}$ denotes a bandwidth of an RB for corresponding PDSCH transmission. $\eta_s$ denotes a slot index, and $N_{ID}^{cell}$ denotes a cell ID. 'mod' denotes modulo operation. In the frequency domain, the location of a reference signal depends on the value of Vshift. Since Vshift depends on the cell ID, the location of the reference signal has different frequency shift values for respective cells.

In the LTE-A (Advanced) system, which is the evolution of 3GPP LTE, high-order MIMO, multi-cell transmission, and advanced MU-MIMO are taken into consideration. In order to support efficient management of the reference signal and an advanced transmission scheme, DRS-based data demodulation is taken into consideration. That is, separately from the DRS (antenna port index 5) for rank 1 beamforming defined in legacy 3GPP LTE (e.g., Release-8), a DRS for two or more layers may be defied to support data transmission through an added antenna.

Meanwhile, as described above, in an LTE system the CRS is transmitted based on a maximum of four antenna ports according to the number of transmission antennas. For example, if the number of transmission antennas of a base station is two, CRSs for antenna ports 0 and 1 are transmitted and, if the number of transmission antennas is four, CRSs for antenna ports 0 to 3 are transmitted.

Figure 8:
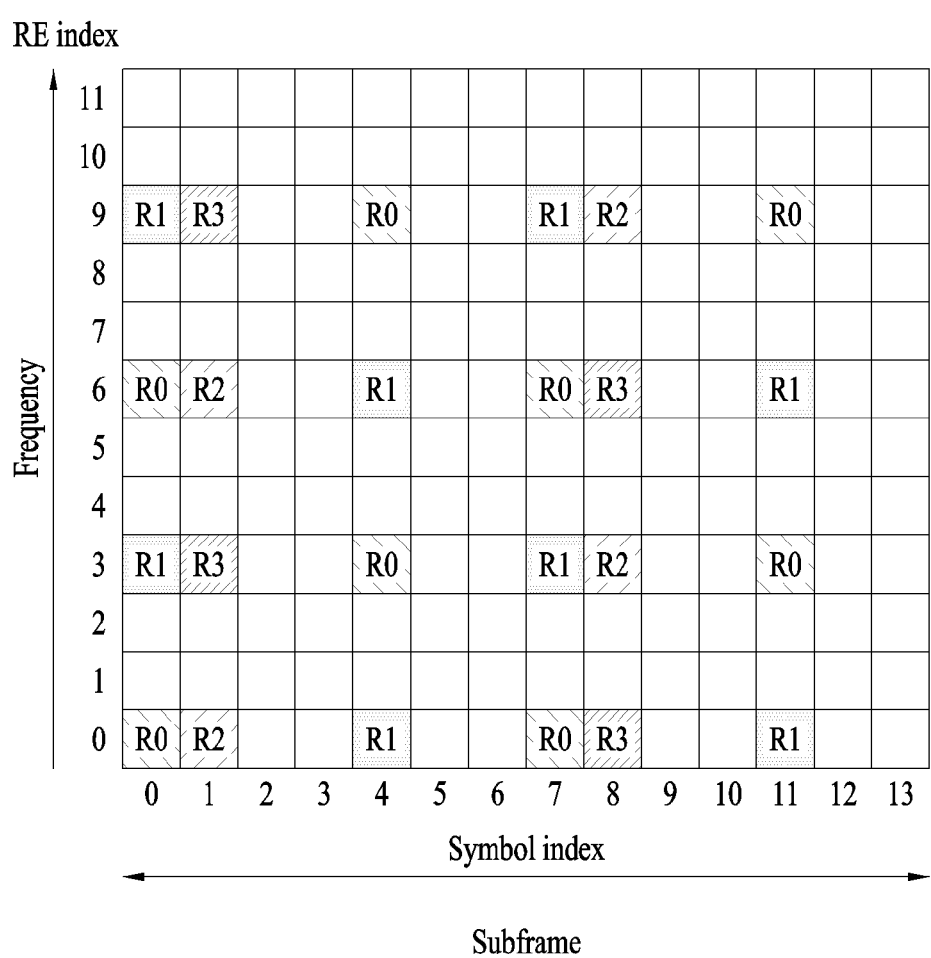
FIG. 8 is a diagram illustrating a general CRS pattern applied when four transmit antenna ports are given in the LTE system.

FIG. 8 is a diagram showing a general CRS pattern in the case in which the number of transmission antenna ports is 4 in an LTE system.

Referring to FIG. 8, if CRSs are mapped to time-frequency resources in the LTE system, an RS for one antenna port on a frequency axis is transmitted in a state of being mapped to one RE among 6 REs. Since one RB includes 12 REs on the frequency axis, two REs of one RB are used as REs for one antenna port.

In an LTE-A system, an evolved form of the LTE system, a base station (eNB) should be designed to support a maximum of eight transmission antennas in downlink. Accordingly, RS transmission for a maximum of eight transmission antennas should also be supported.

More specifically, since only RSs for a maximum of four antenna ports are defined as downlink RSs in the LTE system, if an eNB has four to eight downlink transmission antennas in the LTE-A system, RSs for these antennas should be additionally defined. RSs for channel measurement and RSs for data demodulation should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, in the LTE-A system, if an RS pattern for a maximum of eight transmission antennas is added to the entire band per subframe using the same method as the CRS of the conventional LTE system, overhead is excessively increased.

Accordingly, RSs newly designed in the LTE-A system are roughly divided into two types: a channel measurement RS (Channel Status Information-RS (CSI-RS)) for selecting an MCS, a Precoding Matrix Indicator (PMI) or the like and a Demodulation RS (DM-RS) for demodulation of data transmitted via eight transmission antennas.

The CSI-RS is used only for channel measurement, whereas the existing CRS is used for channel measurement, handover measurement or data demodulation. Since the CSI-RS is transmitted to acquire channel status information, the CSI-RS may not be transmitted per subframe, unlike the CRS. Currently, in the LTE-A standard, CSI-RSs may be allocated to antenna ports 15 to 22 and CSI-RS setting information is defined to be received through higher layer signaling.

In addition, for data demodulation, a DM-RS is transmitted to a UE scheduled in a corresponding time-frequency domain as a DRS. That is, the DM-RS transmitted to a specific UE is transmitted only in a domain scheduled to the UE, that is, in a time-frequency domain in which the UE receives data.

In the LTE-A system supporting up to eight downlink Tx antennas, an eNB should transmit CSI-RSs for all the antenna ports, as described before. Because transmission of CSI-RSs for up to eight Tx antenna ports in every subframe leads to too much overhead, the CSI-RSs should be transmitted intermittently along the time axis to thereby reduce CSI-RS overhead. Therefore, the CSI-RSs may be transmitted periodically at every integer multiple of one subframe, or in a predetermined transmission pattern.

The CSI-RS transmission period or pattern of the CSI-RSs may be configured by the eNB. To measure the CSI-RSs, a UE should have knowledge of a CSI-RS configuration that has been set for CSI-RS antenna ports in its serving cell. The CSI-RS configuration may specify the index of a downlink subframe carrying CSI-RSs, the time-frequency positions of CSI-RS REs in the downlink subframe, a CSI-RS sequence (a sequence used for CSI-RSs, generated pseudo-randomly based on a slot number, a cell ID, a CP length, etc. according to a predetermined rule), etc. That is, a given eNB may use a plurality of CSI-RS configurations and may indicate a CSI-RS configuration selected for use from among the plurality of CSI-RS configurations to a UE(UEs) in its cell.

To identify a CSI-RS for each antenna port, resources carrying the CSI-RS for the antenna port should be orthogonal to resources carrying CSI-RSs for other antenna ports. As described before with reference to FIG. 8, CSI-RSs for different antenna ports may be multiplexed in FDM using orthogonal frequency resources, in TDM using orthogonal time resources, and/or in CDM using orthogonal code resources.

When notifying UEs within the cell of CSI-RS information (i.e. a CSI-RS configuration), the eNB should first transmit to the UEs information about time-frequency resources (time information and frequency information) to which a CSI-RS for each antenna port is mapped. To be more specific, the time information may include the number of a subframe carrying CSI-RSs, a CSI-RS transmission period, a CSI-RS transmission subframe offset, and the number of an OFDM symbol carrying CSI-RS REs for an antenna. The frequency information may include a frequency spacing between CSI-RS REs for an antenna and a CSI-RS RE offset or shift value along the frequency axis.

Figure 9:
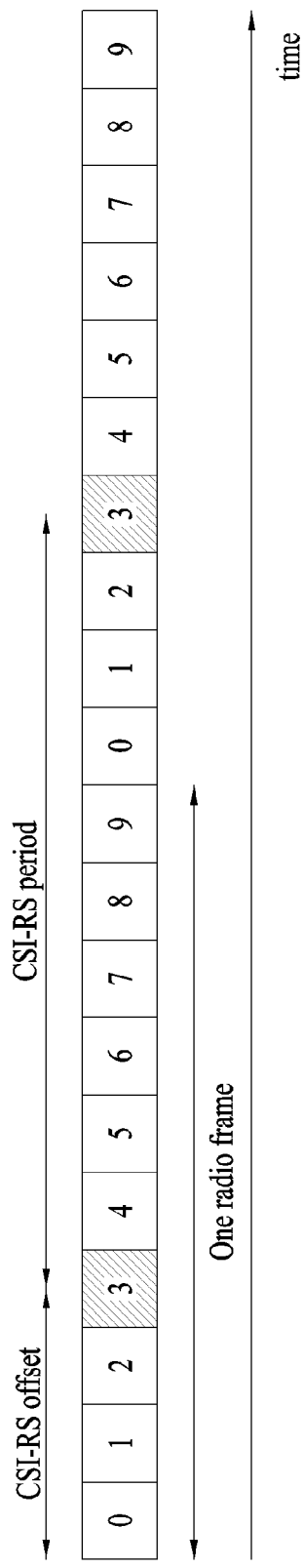
FIG. 9 is a diagram illustrating an example of periodic transmission of a channel state information-reference signal (CSI-RS)

FIG. 9 illustrates an exemplary periodic CSI-RS transmission. A CSI-RS may be transmitted periodically at every integer multiple of one subframe (e.g. in every 5, 10, 20, 40 or 80 subframes).

Referring to FIG. 9, one radio frame is divided into 10 subframes, subframe 0 to subframe 9. The eNB transmits a CSI-RS with a CSI-RS transmission period of 10 ms (i.e. in every 10 subframes) and a CSI-RS transmission offset of 3, by way of example. Different eNBs may have different CSI-RS transmission offsets so that CSI-RSs transmitted from a plurality of cells are uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which an eNB starts CSI-RS transmission in every predetermined period. When the eNB signals a CSI-RS transmission period and offset to a UE, the UE may receive a CSI-RS from the eNB in subframes determined by the CSI-RS transmission period and offset. The UE may measure a channel using the received CSI-RS and thus may report such information as a Channel Quality Indicator (CQI), a PMI, and/or a Rank Indicator (RI) to the eNB. Unless a CQI, a PMI and an RI are separately described herein, they may be collectively referred to as a CQI (or CSI). The above information related to the CSI-RS is cell-specific information common to UEs within the cell. A CSI-RS transmission period and offset may be set separately for each individual CSI-RS configuration. For example, CSI-RS transmission periods and offsets may be separately set for a CSI-RS configuration for CSI-RSs transmitted with zero transmission power and a CSI-RS configuration for CSI-RSs transmitted with non-zero transmission power.

Figure 10:
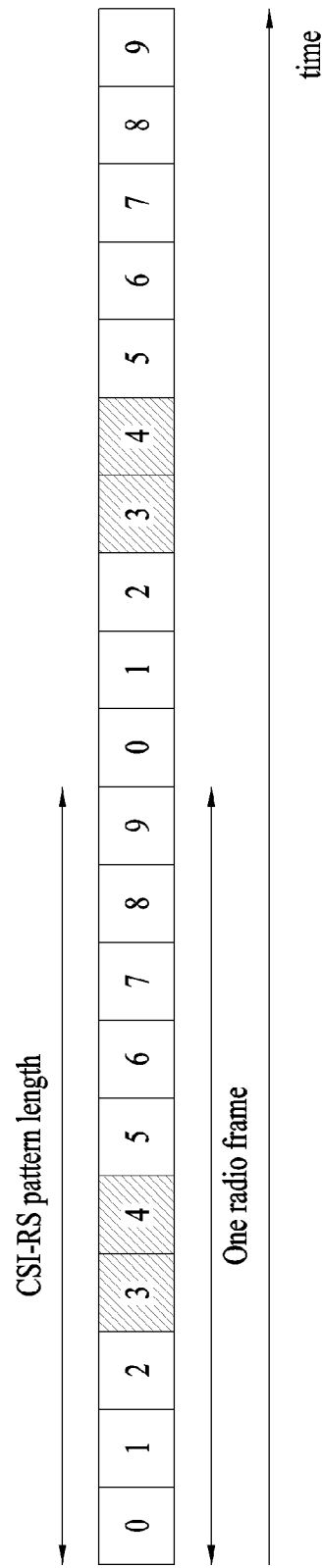
FIG. 10 is a diagram illustrating an example of aperiodic transmission of a channel state information-reference signal (CSI-RS)

FIG. 10 illustrates an exemplary aperiodic CSI-RS transmission. Referring to FIG. 10, one radio frame is divided into 10 subframes, subframe 0 to subframe 9. Subframes carrying CSI-RSs may be indicated in a predetermined pattern. For instance, a CSI-RS transmission pattern may be formed in units of 10 subframes and a 1-bit indicator may be set for each subframe to indicate whether the subframe carries a CSI-RS. In the illustrated case of FIG. 10, the CSI-RS pattern tells that subframe 3 and subrame 4 out of 10 subframes (i.e. subframe 0 to subframe 9) carry CSI-RSs. Such 1-bit indicators may be transmitted to a UE by higher-layer signaling.

Various CSI-RS configurations are available as described above. To enable a UE to receive CSI-RSs reliably for channel measurement, an eNB needs to signal a CSI-RS configuration to the UE. Now a description will be given below of embodiments of the present invention for signaling a CSI-RS configuration to a UE.

CSI-RS Configuration Signaling

The eNB may signal a CSI-RS configuration to the UE in two methods.

One of the methods is for the eNB to broadcast CSI-RS configuration information to UEs by Dynamic Broadcast CHannel (DBCH) signaling.

In the legacy LTE system, an eNB may transmit system information to UEs on a Broadcast CHannel (BCH). If the system information is too much to be transmitted on the BCH, the eNB may transmit the system information in the same manner as downlink data transmission. Notably, the eNB may mask the CRC of a PDCCH associated with the system information by an SI-RNTI, instead of a particular UE ID. Thus, the system information is transmitted on a PDSCH like unicast data. All UEs within the cell may decode the PDCCH using the SI-RNTI and thus acquire the system information by decoding the PDSCH indicated by the PDCCH. This broadcasting scheme may be referred to as DBCH signaling, distinguishably from general Physical BCH (PBCH) signaling.

Two types of system information are usually broadcast in the legacy LTE system. One type of system information is a Master Information Blok (MIB) transmitted on a PBCH and the other type of system information is a System Information Block (SIB) multiplexed with general unicast data in a PDSCH region. As the legacy LTE system defines SIB type 1 to SIB Type 8 (SIB1 to SIB8) for system information transmission, a new SIB type may be defined for CSI-RS configuration information which is new system information not defined as any conventional SIB type. For example, SIB9 or SIB10 may be defined and the eNB may transmit CSI-RS configuration information to UEs within its cell in SIB9 or SIB10 by DBCH signaling.

The other method for signaling CSI-RS configuration information is that the eNB transmits CSI-RS configuration information to each UE by Radio Resource Control (RRC) signaling. That is, the CSI-RS configuration information may be provided to each UE within the cell by dedicated RRC signaling. For example, while a UE is establishing a connection to the eNB during initial access or handover, the eNB may transmit the CSI-RS configuration information to the UE by RRC signaling. Alternatively or additionally, the eNB may signal the CSI-RS configuration information to the UE in an RRC signaling message requesting a channel state feedback based on CSI-RS measurement to the UE.

The foregoing two methods for signaling CSI-RS configurations and a CSI-RS configuration to be used for CSI feedback to a UE are applicable to the embodiments of the present invention.

Hereinafter, a description will be given of a specific embodiment of the present invention related to a method for receiving, by a specific UE, synchronization information for direct communication between UEs using a reference signal as mentioned above.

Figure 11:
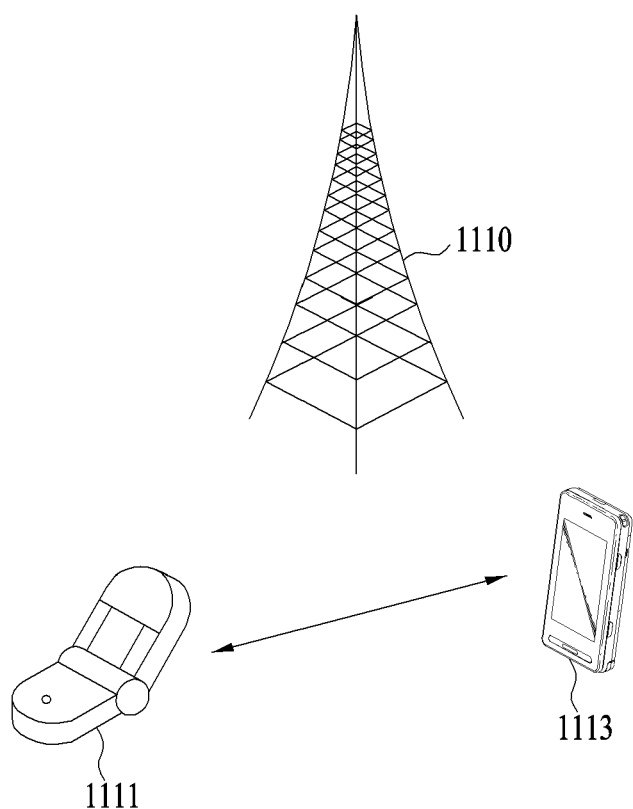
FIG. 11 is a conceptual diagram illustrating direct communication between UEs.

Prior to description of the present invention, direct communication between UEs will be described. FIG. 11 is a conceptual diagram of direct communication between UEs.

Referring FIG. 11, UE1 1111 and UE2 1113 perform direct communication with each other. Herein, UE refers to a terminal of a user. If network equipment such as a BS transmits and receives a signal according to the inter-UE communication scheme, it may be considered as a kind of UE. Meanwhile, an eNB may control the location of a time/frequency resource, transmit power and the like for direct communication between UEs through a proper control signal. However, if UEs are located outside the coverage of the eNB, direct communication between the UEs may be performed without a control signal of the eNB. Hereinafter, direct communication between UEs will be referred as device-to-device (D2D) communication. In addition, a link connected for direct communication between UEs will be referred to as a D2D link, and a link through which a UE communicates with the eNB will be referred to as an eNB-UE (NU) link.

A typical D2D operation includes a D2D discovery operation and a D2D communication operation. Each UE 1111, 1113 performs D2D discovery in order to check if the counterpart UE to perform D2D communication with is located in a region where D2D operation is possible. Each UE 1111, 1113 transmits a unique discovery signal for identifying the UE. If a neighboring UE detects the discovery signal, the neighboring UE may recognize that the corresponding UE is at a close location. Each UE 1111, 1113 checks if the counterpart UE desiring to perform D2D communication operation is positioned nearby through the discovery operation and then performs D2D communication to transmit and receive data.

The D2D discovery operation and D2D communication operation may be performed between UEs performing connected to an eNB to perform communication within the coverage communication or between UEs which are positioned outside the coverage of the eNB and not connected to the eNB. Alternatively, at least one of two UEs connected to a D2D link may be positioned inside the coverage of the eNB, and the other one may be positioned outside the coverage of the eNB coverage. Whether or not a UE is present within the coverage may be checked using a reception quality of a reference signal transmitted by the eNB. Specifically, the UE may measure the RSRP or RSRQ of the reference signal of an eNB. If the measured RSRP or RSRQ is lower than or equal to a certain level, it may be determined that the UE is outside the coverage.

If a UE positioned within the coverage of an eNB transmits a discovery signal, it is advantageous in many ways for the discovery signal to be synchronized with a signal of the eNB. This is because the synchronization operation which is necessary for transmission and reception of the discovery signal may be omitted if several UEs inside the coverage are synchronized with a signal of one eNB. In this case, if a specific UE is allowed to perform the discovery operation with a UE connected to a neighboring cell, the coverage of the discovery signal may be widened. In addition, when the specific UE performs the handover operation to switch a serving cell, synchronization of the discovery signal may be maintained if synchronization of the discovery signal is not directly related to the serving cell.

Figure 12:
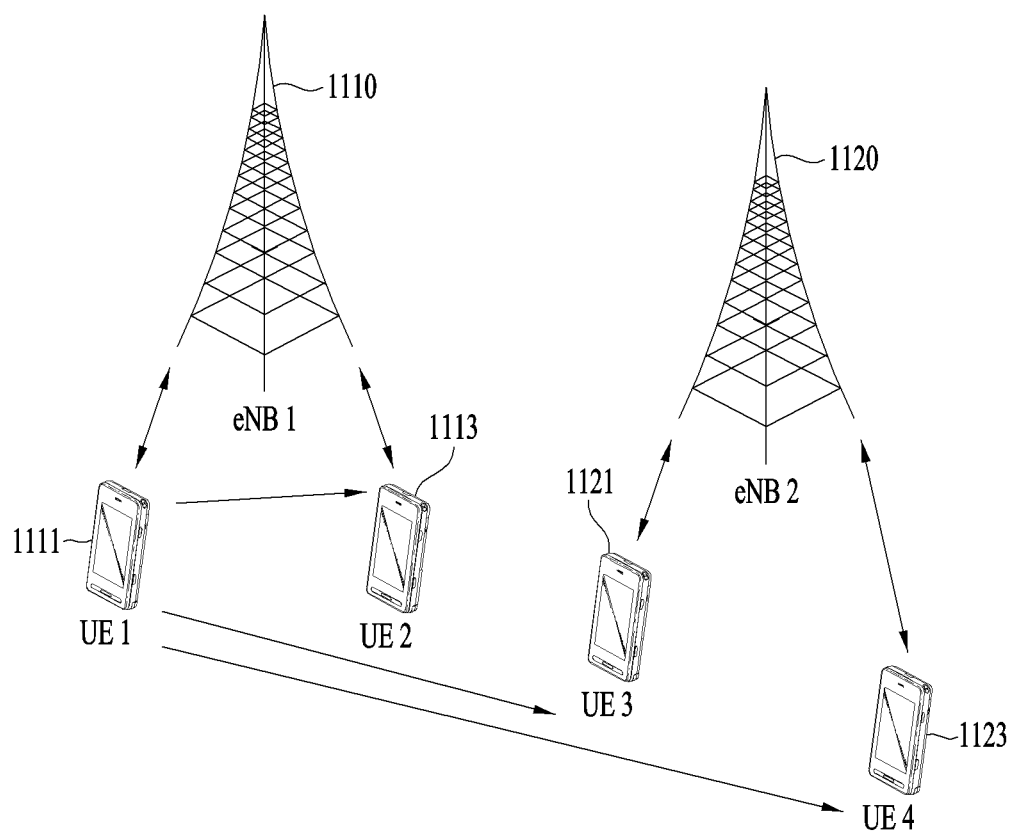
FIG. 12 is a diagram illustrating a method for receiving synchronization information for direct communication between UEs when the UEs are connected to different eNBs, according to an embodiment of the present invention.

FIG. 12 is a diagram illustrating a method for receiving synchronization information for direct communication between UEs when the UEs are connected to different eNBs, according to an embodiment of the present invention. Hereinafter, a description will be given a technique that a specific UE uses to perform the discovery operation with a UE connected to a neighboring cell, with reference to FIG. 12. In this figure, it is assumed that UE1 1111 and UE2 1113 are connected to eNB1 1110, and UE3 1121 and UE4 1123 are connected to eNB2 1120.

If signal transmission and reception between UE3 1121 (or UE4) and the eNB is synchronized with a signal of eNB2 1120, which is a serving cell, UE3 needs to be synchronized with eNB1 1110, which is a neighboring cell, in order to receive or transmit a discovery signal from or to UE1 1111 (or UE2) connected to eNB1 1110.

Even if transmission times of all cells are perfectly synchronized, the eNB of each cell may have a different propagation delay with respect to the positon of a specific UE. Accordingly, signal reception times of the respective cells observed by a UE may not be identical to each other. Further, if a synchronization error between eNBs is large or the eNBs are not synchronized, the discovery operation between UEs which are synchronized with different cells may involve an additional difficulty.

To address this problem, the present invention proposes that a plurality of cells be grouped into one D2D discovery cluster and that one representative cell be selected per cluster. In addition, the present invention proposes that all UEs in one cluster perform the discovery operation in synchronization with a corresponding representative cell.

Hereinafter, it is assumed that eNB1 1110 and eNB2 1120 forms one D2D discovery cluster, and eNB1 is selected as a representative cell. UE1 1111 transmits a discovery signal in synchronization with eNB1 1110, which is the serving cell of the UE and the representative cell of the cluster. UE3 1121 and UE4 1123 which are connected to eNB2 recognize that the discovery signal is synchronized with eNB1. UE3 1121 and UE4 1123 acquires synchronization of eNB1 first, and then detects a discovery signal transmitted by UE1 1121 based on the acquired synchronization.

A D2D discovery cluster may have only one cell. In this case, the cell is selected as the representative cell of the cluster. This configuration may be utilized when D2D discovery operation between cells is unnecessary. Alternatively, even if a representative cell is not separately configured, the configuration may be utilized when D2D discovery between cells is possible. For example, the configuration may be utilized when synchronization between cells is very precisely performed, and signals transmitted from several cells are received almost at the same time as the cell radius is small.

Information on the representative cell in the D2D cluster may be delivered form an eNB to a UE as a part of parameters for D2D operation. For example, the eNB may designate a list of cells belonging to the same cluster and a representative cell ID (identity) of the cluster. If a specific UE is connected to one cell included in the list of cells, the UE may synchronize the discovery signal with a signal of the representative cell of the cluster to which the cell belongs.

The discovery signal may be synchronized with a synchronization signal (or a synchronization reference signal) that the representative cell transmits. The synchronization signal may be, for example, the primary synchronization signal or secondary synchronization signal of the 3GPP LTE system. Or the synchronization signal may be a cell-specific reference signal (CRS) of the representative cell. If the CRS of the representative cell is used as the synchronization signal, synchronization operation may be performed precisely. For example, an operation of verifying the location of the synchronization signal may be performed. In some cases, the synchronization signal may be a tracking reference signal which is transmitted at the same location as the CRS in one subframe and is used to perform time/frequency tracking for the corresponding cell. If the representative cell uses a new carrier type (NCT), which considerably reduces the number of occurrences of CRS transmission compared to the legacy carrier type, the tracking reference signal may be used as the synchronization signal. In addition to the aforementioned signals, a signal such as a channel status information-reference signal (CSI-RS) may be used. Alternatively, a separately signal format may be designed for synchronization of the discovery signal.

A UE which is in the idle mode may operate as follows. A UE having no traffic to communicate with the serving cell operates in the idle mode without being connected to a specific cell. Even if the UE is in the idle mode, the UE needs to perform the D2D discovery operation in some cases. Accordingly, to apply the present invention, a reference forming the basis of determining a representative cell of a D2D cluster is needed. First, the UE in the idle mode selects a cell serving as the reference. Thereafter, the UE may synchronize the D2D discovery signal with the representative cell of the D2D cluster to which the reference cell belongs. Herein, the reference may be a cell having the highest RSRP or RSRQ in which the signal quality of the CRS is best. Alternatively, the reference may be a cell from which a UE in the idle mode receives a paging signal. Alternatively, the UE in the idle mode may receive a list of D2D cluster representative cells from the network, select a cell having the highest RSRP or RSRQ as a cell providing the best signal quality from among the D2D cluster representative cells, and synchronize the same with the discovery signal.

In order to perform the D2D discovery operation with a UE which is outside the coverage, a specific UE inside the coverage may transmit, to the UE outside the coverage, boundary information on a D2D subframe that the specific UE has acquired. For example, the specific UE transmits a predetermined signal at a specific time determined based on the boundary of the acquired cluster subframe. The UE outside the coverage may detect the signal, thereby acquiring synchronization of the D2D discovery signal. If a plurality of D2D discovery clusters overlaps each other, the serving cell may additionally designate a cluster for which boundary information is to be transmitted. Herein, the UE being outside the coverage means that a transmission UE is outside the coverage. Alternatively, the UE being outside the coverage may mean that a transmission UE is inside the coverage, and a reception UE is outside the coverage. Of course, using the same principle, a specific UE may perform D2D communication with a UE which is outside the coverage of a synchronization reference cell and connected to another cell.

Figure 13:
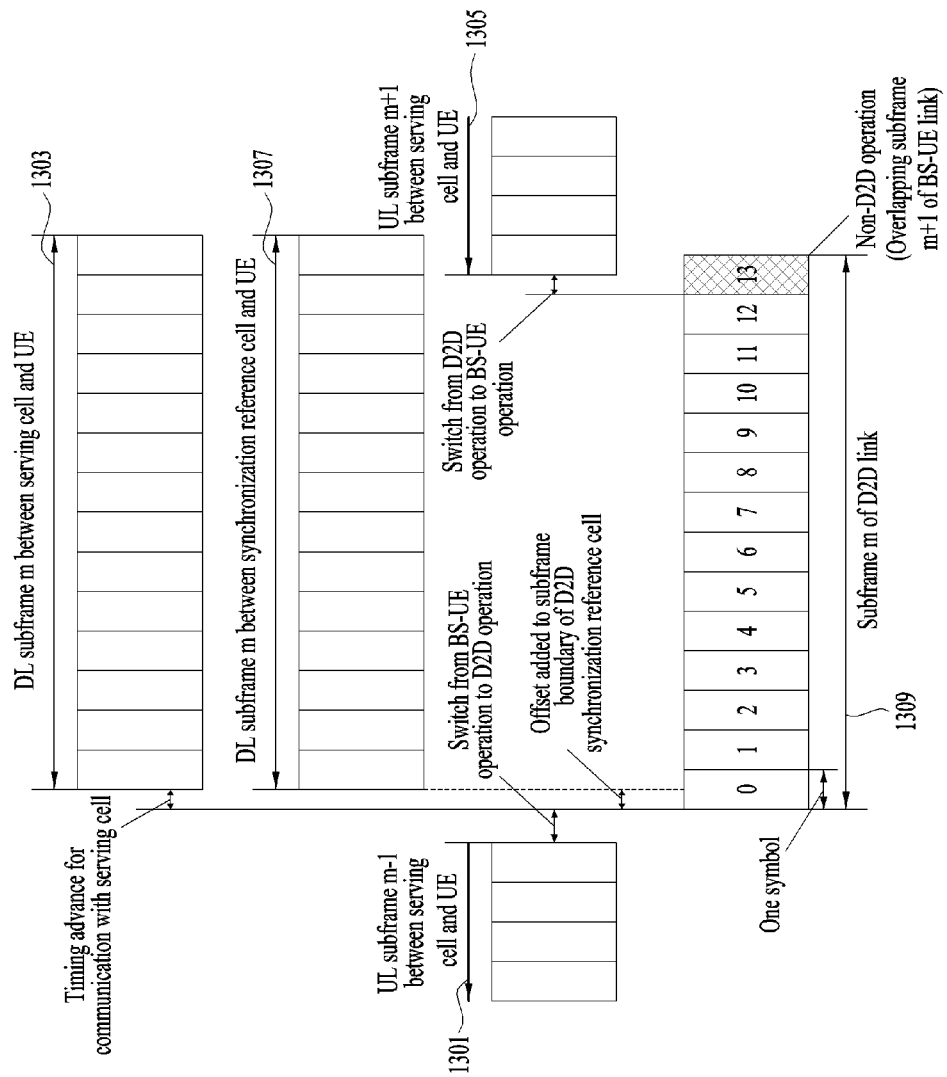
FIG. 13 illustrates resources in the time domain in the case where a representative cell is identical to a serving cell.

FIG. 13 illustrates resources in the time domain in the case where a representative cell is identical to a serving cell. Hereinafter, a description will be given of resources in the time domain which a specific UE uses for the D2D discovery operation when a representative cell and a serving cell are identical to each other, with reference to FIG. 13.

Referring to FIG. 13, a time at which a subframe used for the D2D discovery operation begins is a time obtained by applying a predetermined offset to a time at which the subframe boundary of the representative cell of a D2D discovery cluster is detected. Hereafter, the subframe boundary of the representative cell of a D2D discovery cluster wil be referred to as the boundary of a cluster subframe 1307. In FIG. 13, it is assumed that an offset value is applied such that the boundary of a D2D discovery subframe 1309 is positioned before the boundary of the cluster subframe 1307. Alternatively, an offset value may be applied such that the boundary of the D2D discovery subframe 1309 is positioned after the boundary of the cluster subframe 1307. Alternatively, the offset value may be 0. In this case, the time at hiwch the boundary of the cluster subframe 1307 is detected may be the boundary of the D2D discovery subframe 1309.

Transmission of an uplink radio frame from a UE may begin a certain time before the start point of a corresponding downlink radio frame on the UE. The value corresponding to the certain time is referred to a timing advance value. In general, the UE operates by applying certain timing advance to an uplink transmission signal. As a result, the boundary of an uplink subframe precedes the boundary of the corresponding downlink subframe.

After the UE transmits a signal to a serving cell in uplink subframe m−1 1301, the UE switches an operation of the transception circuit in order to perform D2D discovery in subframe m 1309. Through a series of operations described above, the UE determines the boundary of the D2D discovery subframe 1309 in subframe m, and performs the D2D discovery operation. Thereafter, the UE switches the operation of the transception circuit to perform signal transmission to an eNB in subframe m+1 (1305). Herein, it is assumed that switching the operation of the transception circuit takes time corresponding to half an OFDM symbol.

Due to the time taken to switch the operation of the transception circuit and timing advance for transmission of a signal to the serving cell, some OFDM symbols of a subframe may not be utilized for D2D discovery. Referring to FIG. 13, OFDM symbol #13, which is the last symbol of subframe m 1309, may not be utilized for D2D discovery.

Figure 14:
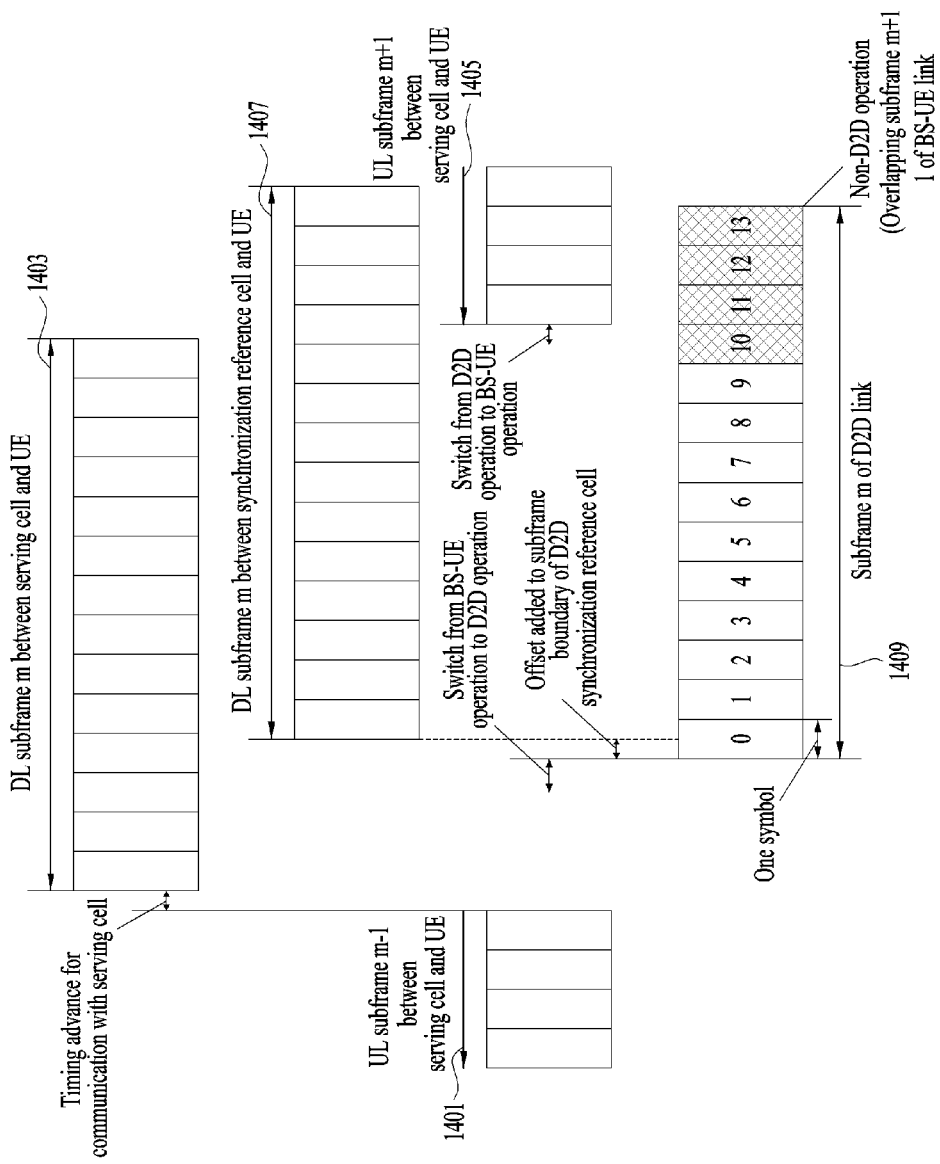
FIG. 14 illustrates resources in the time domain in the case where a representative cell is different from a serving cell.

FIG. 14 illustrates resources in the time domain in the case where a representative cell is different from a serving cell. Referring to FIG. 14, the boundary of a cluster subframe is different from the boundary of a subframe of the serving cell.

In this case, even if the UE operates and a timing advance value is applied to an uplink transmission signal as illustrated in FIG. 14, the number of OFDM symbols usable for the D2D discovery operation in subframe m 1409 is reduced. Referring to FIG. 14, OFDM symbols #0 to #9 of subframe m 1409 are usable for the D2D discovery operation, and 에 the other OFDM symbols #10 to #13 of this subframe are utilized to address boundary misalignment between the subframes of the cluster representative cell and the serving cell.

If the representative cell is different from the serving cell as described above, different numbers of available OFDM symbols of a subframe for transmission and reception of a D2D discovery signal may be configured to support synchronization of the discovery signal with the representative cell. For example, a plurality of configurations may be defined for a D2D discovery subframe, and a different number of available OFDM symbols for transmission and reception of a D2D discovery signal may be set for each configuration. An eNB may signal, to the UE, a D2D discovery subframe configuration to be used. If a plurality of D2D clusters overlaps each other, the eNB may signal, to the UE, a specific D2D discovery subframe configuration that is synchronized with a representative cell signal. The D2D discovery subframe configuration may be transmitted to the UE as a part of parameter configuration information. A time position (e.g., a period or offset value) at which each D2D discovery subframe appears may also be delivered to the UE as a part of the parameter configuration information.

Figure 15:
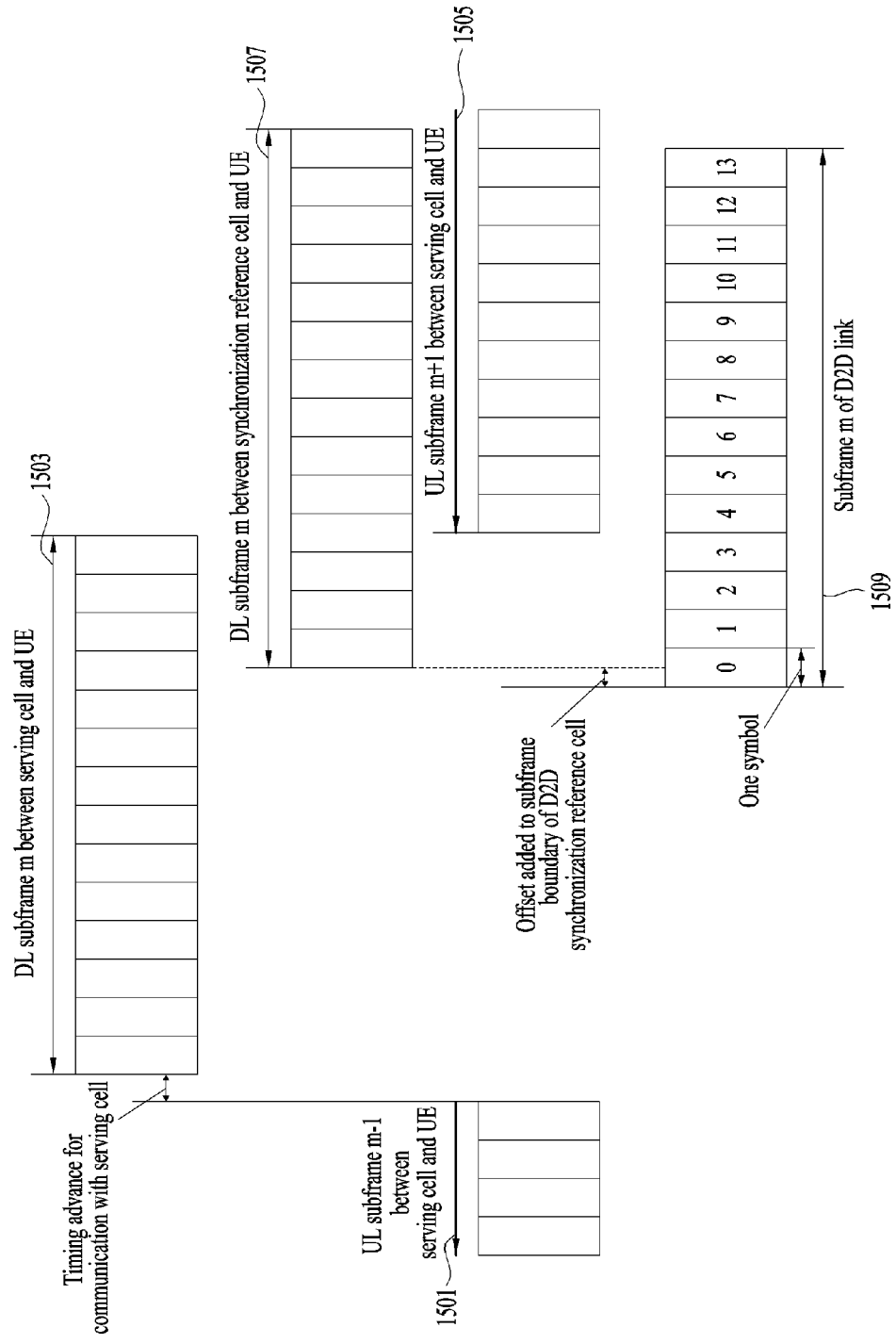
FIG. 15 illustrates resources in the time domain in the case where there is a large error between a representative cell and a serving cell.

FIG. 15 illustrates resources in the time domain in the case where there is a large error between a representative cell and a serving cell. Referring to FIG. 15, there is a large difference between the boundary of a cluster subframe and the boundary of a subframe of the serving cell, compared to the case of FIG. 14. In order to use subframe m+1 1505 for signal transmission and reception with a serving cell, the number of OFDM symbols usable for the D2D discovery operation in subframe m 1509 is further reduced. Referring to FIG. 15, only OFDM symbols #0 to #2 of subframe m 1509 are usable for the D2D discovery operation, and the other OFDM symbols #3 to #13 of the subframe are utilized to address boundary misalignment between the cluster representative cell and the serving cell.

In this case, preferably, the UE performs the D2D discovery operation in subframe m+1 1505 without transmitting a signal to the serving cell. Thereby, the number of symbols available to the D2D discovery operation may increase.

When a part of a subframe is allocated to the D2D operation as described above, signal transmission and reception between the UE and the eNB may be restricted. In the embodiments illustrated in FIGS. 13 and 14, use of subframe m is restricted. In the embodiment illustrated in FIG. 15, use of subframe m and subframe m+1 is restricted. If the eNB is capable of recognizing a time relationship between subframes of respective UEs, the eNB may properly a subframe in which the D2D discovery operation is performed and a neighboring subframe. However, it may be difficult for a specific serving cell to recognize the difference between a cluster subframe boundary and the subframe boundary of a serving cell observed by a specific UE. Accordingly, to ensure safe operation, each cell may issue an instruction to a UE performing the D2D discovery operation so as not to use a subframe in which the D2D discovery operation is performed and neighboring subframes to perform communication with the serving cell. In particular, subframes which are not used for communication with the serving cell may be limited to uplink subframes in which D2D communication usually occurs. Herein, subframes neighboring the subframe in which the D2D discovery operation is performed may refer to some subframes before, after, or before and after the subframe in which the D2D discovery operation is performed.

Each cell may signal, to the UE, whether communication with the serving cell is restricted in subframes neighboring a specific D2D discovery subframe, and also signal, if there is a restriction, subframes which are restricted. In addition, if the UE recognizes that communication with the serving cell is restricted in a specific subframe, the UE may perform a proper operation to address this restriction. For example, if HARQ-ACK (Hybrid Automatic Repeat request-Acknowledge) for a PDSCH transmitted from the serving cell needs to be transmitted in a subframe having the aforementioned restriction, the UE may operate to move the HARQ-ACK to another subframe which is be subject to the restriction.

To assist the serving cell operating as above, the UE may measure the status of synchronization of the current D2D discovery signal and report the same to the serving cell. For example, the UE may measure and report a difference between the boundary of a downlink subframe of the serving cell and the boundary of a cluster downlink subframe. Herein, the cluster downlink subframe means a downlink subframe of a cluster representative cell. Specifically, difference in radio frame, subframe or OFDM symbol may be measured and reported. Alternatively, the UE may report a difference between the boundary of an uplink subframe for transmission to the serving cell and the boundary of a D2D discovery subframe. A rule may be established such that such status reporting is performed when the degree of misalignment between the boundaries of two subframe is higher than or equal to a certain level. For example, if the degree of misalignment between the boundaries of two subframe is higher than or equal to a certain level, the difference between the boundary of the uplink subframe for transmission to the serving cell and the boundary of the D2D discovery subframe in units of radio frames, subframes or OFDM symbols may be reported. In some cases, the UE may simply report on whether the degree of misalignment between the two subframe boundaries is higher than or equal to a certain level.

In order to ensure more accurate synchronization, the serving cell may provide additional information on the representative cell ID of a D2D discovery cluster. In particular, if synchronization of the D2D discovery signal is acquired using the CRS, the serving cell may provide CRS information on the representative cell as the additional information. The additional information may include the number of antenna ports for the representative cell CRS, the location of a subframe in which the representative cell CRS is transmitted, information indicating whether the representative cell uses the NCT by which CRS transmission is reduced in the time/frequency domain, or information on a bandwidth in which the CRS of the representative cell is transmitted. The information on the location of the subfarme in which the CRS of the representative cell is transmitted may be, for example, MBSFN (Multicast Broadcast Single Frequency Network) subframe configuration information of the representative cell. A part of the additional information may be omitted in order to reduce signaling overhead. If a part of the information is omitted, the omitted part may be considered to be the same as parameters of the serving cell. If a signal such as CSI-RS that is intermittently transmitted is used as a reference signal for synchronization, the serving cell may deliver information on the transmission periodicity or time position of the signal.

If the representative cell of a D2D cluster is a neighboring cell, not a serving cell, the signal quality may not be as good as that of the serving cell. In this case, the neighboring cell may reduce transmit power on a specific resource such that the UE receives the representative cell signal of the D2D cluster more accurately. The operation of reducing transmit power on the specific resource includes a muting operation of setting transmit power to 0 on the resource. Accordingly, interference that the neighboring cell applies the representative cell signal of the D2D cluster occupying the specific resource may be reduced.

Figure 16:
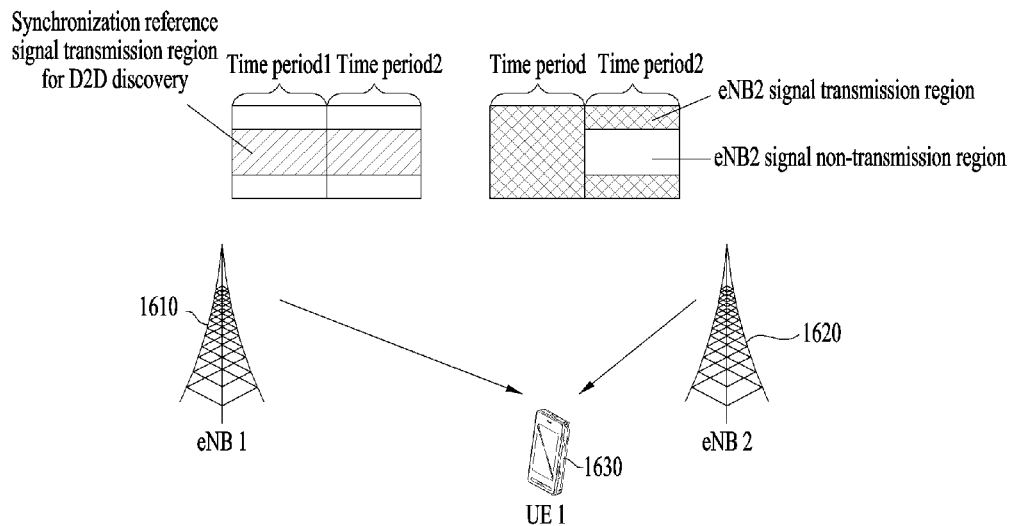
FIG. 16 is a diagram illustrating operation of a neighboring cell controlling transmit power on a specific resource to perform synchronization.

FIG. 16 is a diagram illustrating operation of a neighboring cell controlling transmit power on a specific resource to perform synchronization.

Referring to FIG. 16, eNB2 1620 serves as a serving cell eNB for UE 1630, and eNB1 1610 serves as a representative cell eNB. It is assumed that the UE 1630 is synchronized with a signal transmitted from eNB1 1610 to perform the discovery operation. Herein, in order to protect the representative cell signal of the D2D cluster in the second time period, eNB2 1620 does not transmit a signal on a resource corresponding to the second time period.

To this end, the representative cell may signal, through an inter-cell backhaul link, a time/frequency resource to be used for synchronization reference signal transmission for a discovery signal. Additionally, the cell may signal a time/frequency region in which low power transmission is to be performed in order to protect a synchronization reference signal for the discovery signal. In the embodiment illustrated in FIG. 16, the UE 1630 preferably detects a signal of eNB1 1610 only in the second time period, which is the non-transmission region of eNB2 1620 to synchronize the discovery signal, thereby avoiding interference from eNB2 1620.

Each serving cell may deliver information on a specific resource to the UE 1630. The information on the specific resource indicates a resource on which the synchronization reference signal is protected. Upon acquiring the information, the UE 1630 may detect the reference signal for synchronization of the discovery signal only on the indicted resource. Accordingly, a signal component subjected to a lot of interference may be excluded beforehand. If the UE does not receive the information, the UE may use only a signal component of a specific resource to detect a signal used as a reference for synchronization of the discovery signal. This operation is effective when the synchronization reference signal is intermittently transmitted. For example, if a synchronization signal of the representative cell of the D2D discovery cluster is used as the reference signal, the synchronization signal of the representative cell is not detected in the whole time region, but may be detected only in a part of the time region preceding the subframe in which the D2D discovery operation is performed. In this case, the other cells may reduce transmit power of a frequency region in which the synchronization signal of the representative cell is transmitted in the part of the time region.

Similar operation may be performed if CRS is used as a synchronization reference signal for the discovery signal. In this case, the UE may receive information on a specific frequency region from the serving cell. The information on the specific frequency region indicates a frequency region in which the CRS of the representative cell is protected. Accordingly, the UE may recognize whether it is preferable to attempt to detect the CRS of the representative cell only in a certain frequency region.

Hereinafter, a description will be given of synchronization operation in the frequency domain.

The signal of the representative cell of a D2D cluster described above may be used as a reference signal not only for time synchronization but also for frequency synchronization. Each UE performs frequency-domain processes such as modulation/demodulation based on a signal generated by the oscillator thereof. In this case, the signal generated by the oscillator of each UE may have a certain error. Thereby, if the UEs transmits discovery signals without a separate reference for frequency synchronization, the signals may be multiplexed with frequency synchronization disturbed due to errors in the oscillators of the UEs, and as a result, transmission and reception performance is degraded. To address this issue, the signal of the representative cell of the D2D cluster described above may be used as a reference for frequency synchronization of the discovery signal. As a result, discovery signals transmitted from the respective UEs are synchronized in the frequency domain, and thus transmission and reception performance may be improved. That is, a UE to transmit a discovery signal recognizes a reference frequency from the signal of the representative cell of the D2D cluster, and generates and transmits a discovery signal based on the recognition.

The generated discovery signal may not be frequency-synchronized with signals that the UE transmits to the serving cell. In particular, if the serving cell is not the representative cell of the D2D cluster, the generated discovery signal may not be frequency-synchronized with other signals of the UE. As a result, if the serving cell for a specific UE is different from the representative cell of the D2D cluster, the UE may not be capable of transmitting a D2D signal and a signal for a serving cell eNB at the same time. In this case, only one of the two signals may be transmitted according to a pre-established rule. For example, if the signal to the eNB contains important control information, the signal may be transmitted to the eNB first. Alternatively, in order to prevent multiple UEs attempting to receive the D2D signal from detecting an absent signal, the D2D signal may be transmitted first. However, if an error between the frequency of the signal transmitted to the serving cell eNB and the frequency of the D2D signal is smaller than or equal to a certain level, it may be possible for the UE to transmit the two signals at the same time.

To ensure the operation as above, the UE may measure an error between the frequency of the serving cell signal and the frequency of the representative cell signal of the D2D cluster and report the same to the serving cell eNB. The eNB may perform scheduling with reference to the report. If a signal to each eNB and a D2D signal are transmitted according to the serving cell signal and the representative cell signal of the D2D cluster, the reporting may be simplified as reporting on whether the two types of signals are transmittable at the same time. For example, the reporting may be simplified into transmission of 1-bit information.

Meanwhile, a UE to receive a discovery signal may receive discovery signals transmitted from the respective UEs, assuming that the discovery signals are synchronized with a specific signal of a D2D cluster representative cell used as the reference for frequency synchronization with a frequency offset within a certain error. That is, quasi co-location may be assumed in terms of Doppler shift and/or Doppler spread.

A UE needs to perform D2D communication outside the coverage of an eNB, the signal of the representative cell of a D2D cluster may not be properly received. Accordingly, a reference for time/frequency synchronization needs to be separately established. In this case, a UE inside the eNB coverage may receive an instruction from the eNB and transmit a predetermined reference signal to a UE outside the eNB coverage. Alternatively, the UE outside the eNB coverage may transmits a predetermined reference signal according to a pre-established rule. A UE which is outside the eNB coverage and receives the reference signal from the UE inside or outside the eNB coverage may use the reference cell as a reference for time/frequency synchronization. Of course, using the same principle, the UE may perform D2D communication with another UE which is outside the coverage of the eNB for the UE and connected to another cell.

Using the signal of the representative cell of a D2D cluster as a reference for time and/or frequency synchronization as described above may also be applied when a UE performs D2D communication in which the UE directly transmit and receives data. However, if the reception time of a signal is used as a reference for D2D even when large timing advance is given or synchronization between cells is not acquired as illustrated in FIG. 14 or 15, many OFDM symbols may be wasted and performance of D2D communication may be degraded. In this case, a UE performing D2D communication may configure time synchronization, i.e., a subframe boundary, and frequency synchronization separately. Time synchronization, namely the subframe boundary may be derived from synchronization of a downlink subframe or uplink subframe used for communication with an eNB, utilizing as many symbols as possible for D2D communication. To prevent performance degradation resulting from frequency asynchronizatoin between UEs, a signal of the representative cell of the D2D cluster may be used as a reference for frequency synchronization. Similarly, a UE performing the D2D discovery operation may use the signal of the serving cell as a reference for time synchronization, while using the signal of the representative cell of the D2D cluster as a reference for frequency synchronization. This method may be useful when many OFDM symbol cannot be utilized as cells are not synchronized sufficiently. The operation may be reversely applied for frequency and time.

When a specific UE determines a specific cell as a reference for synchronization in order to perform D2D operation, a plurality of cells may be utilized as the reference. Still in this case, the principle of the present invention described above may be applied.

A UE divides a series of time/frequency resources on which the D2D operation is performed or attributes of the D2D signal transmitted and received by the UE into a plurality of groups. The UE may use a different cell for each divided group as a reference for time and/or frequency synchronization. In this case, a UE connected to multiple cells to transmit and receive signals may use a proper cell as the reference for synchronization according to the situation to perform the D2D operation.

Figure 17:
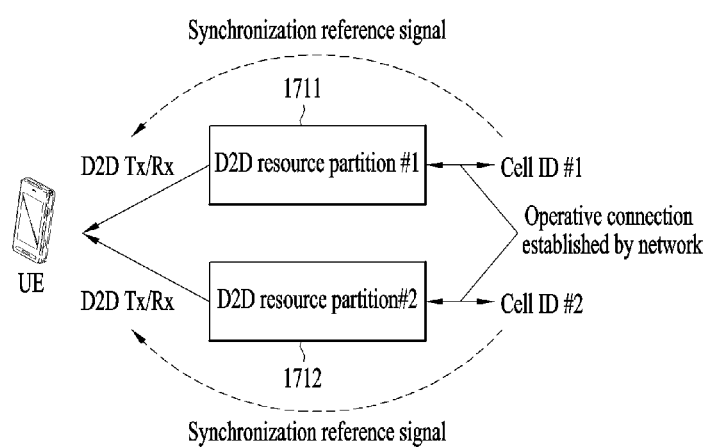
FIG. 17 is a diagram illustrating a method for receiving synchronization information for direct communication between UEs, according to one embodiment of the present invention.

FIG. 17 is a diagram illustrating a method for receiving synchronization information for direct communication between UEs, according to one embodiment of the present invention.

Hereinafter, a description will be given of a method for dividing all time/frequency resources into a plurality of groups and using a plurality of cells as the reference for synchronization, with reference to FIG. 17.

First, the UE divides all time/frequency resources used for the D2D operation into a plurality of groups. Thereafter, an ID of a cell to be used as the reference for time and/or frequency synchronization may be separately designated in each partition. This operation is advantageous in that an optimized cell is used as the reference for synchronization in each partition. The optimized cell may be, for example, a cell operating as a serving cell for multiple UEs that transmit signals in a partition.

Referring to FIG. 17, an UE utilizes different cells as the reference for synchronization in time/frequency resource partition #1 1711 and resource partition #2 1712. Herein, utilizing a specific cell as the reference for synchronization in a specific resource partition means that the following situation may be assumed in view of a reception UE receiving a D2D signal. Transmission UEs that transmit D2D signals in a corresponding resource region are in time/frequency synchronization with a corresponding cell within a certain error range, and therefore the reception UE may assume, based on the time/frequency synchronization acquired from the cell, that the D2D signals transmitted from the respective transmission UEs are received within a certain error range.

The eNB may pre-deliver, to the UE, at least one of information on D2D resource partition and information on operative connection between each resource partition and a cell ID used as the reference for synchronization as a part of configuration information.

Similarly, all D2D signals may be divided into a plurality of groups.

Figure 18:
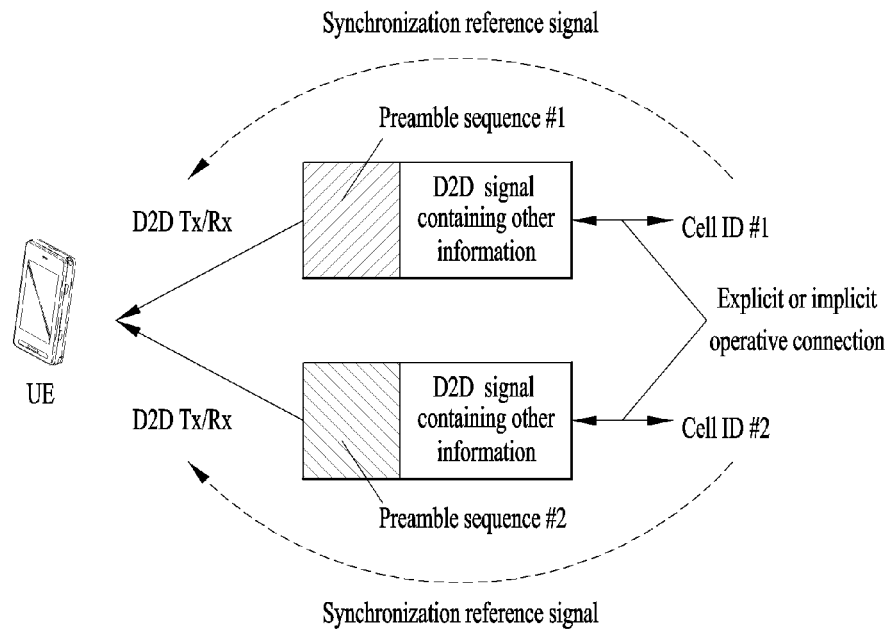
FIG. 18 is a diagram illustrating a method for receiving synchronization information for direct communication between UEs, according to another embodiment of the present invention.

FIG. 18 is a diagram illustrating a method for receiving synchronization information for direct communication between UEs, according to another embodiment of the present invention. Hereinafter, a description will be given of dividing all D2D signals into a plurality of groups and separately designating the ID of a cell used as the reference for time and/or frequency synchronization for each group, with reference to FIG. 18.

A UE may divide all D2D signals into a plurality of groups according to configuration of parameters that need to be predetermined to receive the D2D signals, and separately designate a cell ID to used as the reference for time and/or frequency synchronization for each group. The parameters that need to be predetermined to receive the D2D signals may include, for example, a demodulation reference signal (DM-RS) sequence or a preamble sequence. Herein, the demodulation reference signal is a signal used as a reference for demodulation of information such as the ID of a UE transmitting a D2D signal. The demodulation reference signal represents a signal whose location and transmission properties are pre-known to a reception UE. Hereinafter, the demodulation reference signal will be referred to as a DM-RS, and the demodulation reference signal sequence will be referred to as a DM-RS sequence. The preamble is a signal transmitted in order to allow the reception UE to acquire accurate time/frequency synchronization before a D2D signal containing various kinds of information is transmitted. The preamble represents a signal whose location and transmission properties are pre-known to the reception UE.

If a UE receives a discovery signal having a specific parameter, the UE needs to operate to utilize time/frequency synchronization acquired from a synchronization reference cell operatively connected with the parameter. Alternatively, different synchronization reference cells may be assigned to the D2D discovery signal and the D2D communication signal. When a D2D discovery signal is received, time/frequency synchronization acquired from a cell operatively connected with the D2D discovery signal may be utilized. Alternatively, when a D2D communication signal is received, time/frequency synchronization acquired from a cell operatively connected with the D2D discovery signal may be utilized Referring to FIG. 18, a UE 1801 utilizes different cells for preamble sequence #1 1811 and preamble sequence #2 (1812) as a synchronization reference. Herein, utilizing a specific cell as a synchronization reference for a specific D2D signal means that a reception UE receiving the D2D signal may assume the following situation. Since transmission UEs transmitting D2D signals in a corresponding resource region are in time/frequency synchronization with a corresponding cell with a certain error range, the reception UE may assume, based on the time/frequency synchronization acquired from the cell and/or a operatively connected preamble, that the D2D signals transmitted from the transmission UEs are received within a certain error range.

In FIG. 18, it is assumed that a cell to be used as a synchronization reference is differently configured according to a seed value for generating a sequence of a preamble positioned at the starting part of a D2D signal. It is also assumed that preamble sequence #1 1811 is operatively connected with cell ID #1 and preamble sequence #2 1812 is operatively connected with cell ID #2.

When the reception UE detects a D2D signal that uses preamble sequence #1 1811, the reception UE attempts signal detection based on time/frequency synchronization acquired from cell ID #1. When the reception UE detects a D2D signal that uses preamble sequence #2 1812, the reception UE attempts signal detection based on time/frequency synchronization acquired from cell ID #2.

Similarly, when a transmission UE transmits a D2D signal that uses preamble sequence #1 1811, the transmission UE transmits the signal based on time/frequency synchronization acquired from cell ID #1. When the transmission UE transmits a D2D signal that uses preamble sequence #2 1812, the transmission UE transmits the signal based on time/frequency synchronization acquired from cell ID #2.

If the reception UE is capable of acquiring synchronization simply by directly detecting a preamble, the operation of acquiring synchronization from each reference cell may be omitted. In this case, if the reception UE detects a D2D signal that uses preamble sequence #1 1811, the reception UE immediately attempts signal detection on an operatively connected frequency/time resource based on time/frequency synchronization acquired from preamble sequence #1 1811. If the reception UE detects a D2D signal that uses preamble sequence #2 1812, the reception UE immediately attempts signal detection an operatively connected frequency/time resource based on time/frequency synchronization acquired from preamble sequence #2 1812.

In addition, the operation described above may be performed through the relationship of operative connection between a DM-RS sequence and a synchronization reference cell ID. If a reception UE detects a D2D signal that uses DM-RS sequence #1, the reception UE attempts signal detection based on time/frequency synchronization acquired from cell ID #1. If the reception UE detects a D2D signal that uses DM-RS sequence #2, the reception UE attempts signal detection based on time/frequency synchronization acquired from cell ID #2. Similarly, if a transmission UE transmits a D2D signal that uses DM-RS sequence #1, the transmission UE transmits the signal based on time/frequency synchronization acquired from cell ID #1. If the transmission UE transmits a D2D signal that uses DM-RS sequence #2, the transmission UE transmits the signal based on time/frequency synchronization acquired from cell ID #2.

In addition, the same cell ID used as a synchronization reference may be utilized to perform scrambling of a discovery message.

An eNB may pre-deliver, to a UE, explicit information on operative connection between a D2D signal parameter and a synchronization reference cell ID used as a reference for synchronization as a part of D2D-related configuration information. That is, the eNB may signal, to the UE, a cell ID to be used as the reference for synchronization when a D2D signal is transmitted and received using a certain parameter. Alternatively, an implicit operative connection relationship may be used. In this case, if a specific signal parameter generated from a specific cell ID, a cell having the same ID may be used as the reference for time/frequency synchronization.

Meanwhile, the preamble shown in FIG. 18 is intended for time/frequency synchronization between a transmission entity and a reception entity. Accordingly, the PSS (Primary Synchronization Signal) and/or the SSS (Secondary Synchronization Signal) which has been used for synchronization between the legacy eNB and the legacy UE may be transmitted as a specific form of such preamble. In addition, the PSS and/or SSS may be changed to a proper form according to the D2D situation. For example, since it is expected that transmission from a UE will use a lower transmit power than transmission from an eNB, the PSS and/or SSS may be repeatedly transmitted several times to deliver sufficient energy.

Embodiments illustrated in FIGS. 17 and 18 may be combined. In a specific D2D time/frequency region, a specific cell operatively connected with a specific cell ID may be utilized as a reference for time/frequency synchronization. At the same time, a DM-RS sequence or preamble sequence of a D2D signal may be generated using a parameter that is operatively connected with the specific cell ID explicitly or implicitly.

The principle described above may also be applied when a UE performs the D2D operation outside the coverage. When the D2D operation is performed outside the coverage, a specific UE may transmit a time/frequency synchronization reference signal, and UEs receiving the signal performs synchronization based on the synchronization reference signal. Some UEs may detect two or more synchronization reference signals. In addition, if D2D signals are transmitted and received on different time/frequency resources, time/frequency synchronization acquired from a synchronization reference signal operatively connected with each resource may be utilized. Alternatively, if D2D signals of different parameters are transmitted and received, time/frequency synchronization acquired from a synchronization reference signal operatively connected with each parameter may be utilized. In particular, as illustrated in FIG. 18, if there is an implicit relationship of operative connection between a cell ID for generating a DM-RS sequence or preamble sequence of a D2D signal and a cell ID for generating a sequence of a synchronization reference signal transmitted from a specific UE, and the D2D signal transmitted and received using a specific ID, the UE may use time/frequency synchronization acquired from a synchronization reference signal generated based on the ID. In this case, sequences of synchronization reference signals transmitted from different UEs need to be distinguished from each other. Each transmission UE may stochastically select, within a certain region, an ID to be used in transmitting the synchronization reference signal.

There may be a case where a specific UE performs the D2D operation with a UE inside the coverage and another UE outside the coverage at the same time. In this case, the ID of a cell used as a reference for time/frequency synchronization may be determined based on an attribute of a D2D resource partition or a D2D signal. Alternatively, the attribute of a specific UE transmission reference signal may be determined for respective attributes of a D2D resource partition or D2D signal. For example, a specific UE may perform the D2D operation with UEs inside the coverage in D2D resource partition 1, using a specific cell as a synchronization reference. In addition, the specific UE may perform the D2D operation with UEs outside the coverage in resource partition 2, using a reference signal as the reference for synchronization.

In performing the aforementioned operation, one or more synchronization reference cells may be used as a reference for time and/or frequency synchronization in one time/frequency resource partition. That is, when a series of cells are well synchronized in the time or frequency domain, any one of the cells may be configured as a reference for synchronization. If the cells are well synchronized in the time or frequency domain, there may be no problem with synchronization for the D2D operation even if any one of the cells is used as the reference for synchronization.

Figure 19:
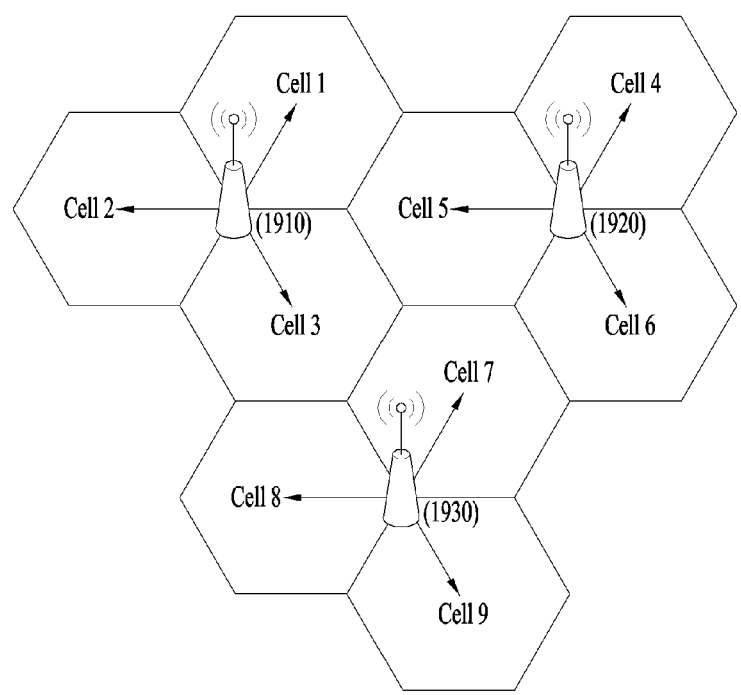
FIG. 19 is a diagram illustrating a method for receiving synchronization information for direct communication between UEs when there are multiple synchronization reference cells, according to one embodiment of the present invention.

FIG. 19 is a diagram illustrating a method for receiving synchronization information for direct communication between UEs when there are multiple synchronization reference cells, according to one embodiment of the present invention.

An eNB transmits a list of one or more cells which are well synchronized as candidate synchronization reference cells in each time/frequency resource partition. A UE receiving the cell list may select the most appropriate cell from among the cells included in the list, performing synchronization. The most appropriate cell may be, for example, a cell having the highest receive power or a cell having the best reception quality. Alternatively, the UE receiving the cell list may acquire synchronization of each cell in the list, and then perform synchronization for D2D operation with an average value of the acquired synchronization.

For example, if an eNB creates a plurality of sectors through sectorization for forming a plurality of transmission beams in different directions and form an independent cell in each sector, well-synchronized cells may be cells generated by the same eNB. This is because the cells have the same source for time/frequency synchronization.

Referring to FIG. 19, eNB1 1910 forms cell 1, cell 2 and cell 3, eNB2 1920 forms cell 4, cell 5 and cell 6, eNB3 1930 forms cell 7, cell 8 and cell 9. In this case, the network transmits, to a UE, a list of synchronization reference cells for one time/frequency resource partition. The list of synchronization reference cells includes three cells formed by one eNB.

The UE receiving the synchronization reference cell list may perform synchronization for the D2D operation using the list. Specifically, the UE receiving the synchronization reference cell list may select the most appropriate cell from among the cells included in the list, performing synchronization. Alternatively, the UE receiving the cell list cell may be synchronized with the cells included in the list, and then acquire an average value of synchronization to acquire synchronization for the D2D operation.

Even if cells are generated by different eNBs, sufficient synchronization may be acquired if a network operation based on inter-cell synchronization is performed. In this case, the cells generated by different eNBs may also be included in the list of synchronization reference cell of the same time/frequency resource partition. The network operation based on inter-cell synchronization may be, for example, TDD (Time Division Duplex) operation, in which time synchronization is basically performed or interference coordination operation, in which interferences on time resources is coordinated.

If a preamble for time/frequency synchronization or a DM-RS for demodulation of a D2D signal is transmitted in a resource partition for transmission and reception of the D2D signal as illustrated in FIG. 17 or 18, a plurality of synchronization reference cells may be applied in one resource partition as described above. In this case, if a sequence of the preamble or DM-RS is determined using an implicit operative connection relationship, it may be unclear which cell ID to use.

In this case, one cell may be selected from among the synchronization reference cells according to a pre-established rule and utilize the same as a cell ID for generating a sequence of the preamble or DM-RS. A cell may be selected based on whether the cell is the first designated cell among the designated synchronization reference cell or whether the cell has the least or greatest cell ID among cell IDs designated as the synchronization reference cells.

If an explicit eNB signal is used, the eNB may designate a cell ID to be utilized to generate a preamble or DM-RS in a specific resource partition. Alternatively, the eNB may designate a seed value for signal generation.

If a plurality of synchronization reference cells is designated, the eNB may additionally designate the ID of at least one cell through additional signaling such that the ID is utilized in a preamble or DM-RS. Preferably, the eNB may additionally designate the ID of at least one of the synchronization reference cells. When only one synchronization reference cell is designated, the ID of the synchronization reference cell may be automatically designated such that the ID is utilized in generating a preamble or DM-RS. That is, when only one synchronization reference cell is designated, the cell ID designated by the eNB to generate a preamble or DM-RS may be considered as the synchronization reference cell of the given resource partition.

Even if a preamble for D2D synchronization on a time/frequency resource is transmitted as illustrated in FIG. 18, the process of detecting the preamble may be omitted in some cases. If a specific UE is capable of performing synchronization by directly measuring a synchronization reference cell having a cell ID utilized in generating the preamble, the UE may immediately participate in the process of transmission and reception of a D2D signal, omitting the process of detecting the preamble. For example, if a sufficient signal quality is obtained from the synchronization reference cell, the process of detecting the preamble may be omitted. Otherwise, the UE may detect a preamble generated with the designated cell ID first, and then receive a D2D signal based on synchronization acquired by detecting the preamble.

Hereinafter, a description will be given of a case where each UE applies the embodiment of the present invention described above by interpreting the embodiment in terms of a relation to a serving cell.

When there is a plurality of D2D cluster as shown in FIG. 17, a plurality of discovery resource partitions assigned to each D2D cluster exists. Herein, the discovery resource partition refers to a resource partition assigned for the D2D discovery operation. In this case, the serving cell transmits information on a representative cell ID in order to signal, to UEs belonging thereto, the ID of the representative cell of a D2D cluster that uses each discovery resource partition. UEs receiving the information on the representative cell ID derives parameters of a D2D signal transmitted in a discovery resource partition. For example, parameters used to generate a DM-RS sequence, a preamble sequence or a scrambling sequence of a discovery message are derived from the representative cell ID. In this sense, a representative cell ID in each discovery resource partition may be referred to as a signal generation seed value. Of course, all relevant parameters may be derived from one representative cell ID (or one signal generation seed value), or a representative cell ID (or a signal generation seed value) to be applied to generation of each parameter may be separately designated.

Meanwhile, a serving cell may transmit, to a UE, information on a list of cells used as the reference for time/frequency synchronization in each discovery resource partition in order to inform the UE of the list. In this case, if the serving cell is included in the list, the UE may transmit and receive a D2D signal generated from a representative cell ID of a corresponding resource partition based on time/frequency synchronization of the serving cell in the resource partition. Herein, the list of cells serving as the reference for time/frequency synchronization may be simplified. The serving cell may simply signal, to the UE, whether or not the serving cell can be used in the resource partition as the reference for time/frequency synchronization.

When the serving cell transmits a list of cells, signaling of the time/frequency synchronization reference cell list transmitted by the serving cell may take the form of {ID of the representative cell, whether the serving cell is included in the time/frequency synchronization reference cell list, a list of cell IDs of cells which can be the reference for time/ frequency synchronization in place of the serving cells} for a specific discovery resource partition. The ID of the representative cell may be replaced with a seed value for generating various signals. The item indicating whether the time/frequency synchronization reference cell list includes the serving cell may be replaced with an item indicating whether synchronization with the serving cell is acquired. The list of cell IDs included in the form as the last item may be omitted to reduce signaling overhead.

If the serving cell is designated as a cell which is not used as the reference for synchronization in a resource partition, the UE may acquire synchronization through a separate signal. If the serving cell signals the ID of a cell used as the reference for synchronization in the resource partition, the UE may acquire synchronization with the cell having the ID. If the serving cell does not signal the ID of a cell used as the reference for synchronization, the UE may use the representative cell ID to directly detect a DM-RS sequence or preamble sequence, and acquire synchronization using the detected sequence.

If cells used as the reference for synchronization in a specific resource partition do not include the serving cell, this means that the serving cell is not synchronized with a cell used as the reference in the partition. In this case, the serving cell may assist UEs in acquiring synchronization with a reference cell which is not synchronized with the serving cell. Specifically, the serving cell may additionally transmit, to the UE, information on the degree of an error of synchronization between the synchronization reference cell and the serving cell. The UE receiving the information retrieves a synchronization reference cell which is not the serving cell within the degree of the error, thereby reducing time and battery consumption taken for synchronization search.

The principle of the present invention described above may also be applied to D2D communication in which UEs positioned in different cells transmit and receive user traffic.

Figure 20:
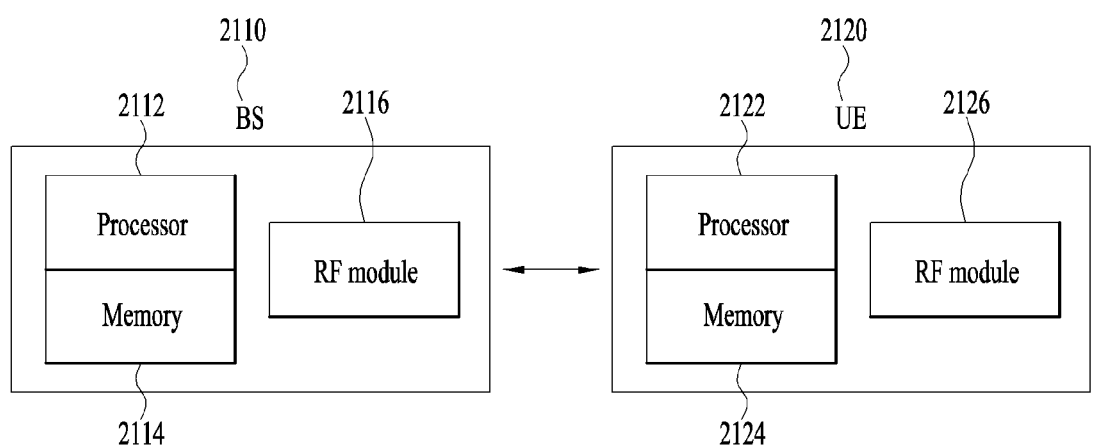
FIG. 20 is a block diagram illustrating configurations of communication apparatuses according to one embodiment of the present invention.

FIG. 20 is a block diagram illustrating configurations of communication apparatuses according to one embodiment of the present invention.

Referring to FIG. 20, a wireless communication system includes a BS 2010 and a UE 2020.

On downlink, a transmitter may be a part of the BS 2010, and a receiver may be a part of the UE 2020. On uplink, the transmitter may be a part of the UE 2020, and the receiver may be a part of the BS 2010. The BS 2010 includes a processor 2012, a memory 2014 and a radio frequency (RF) unit 2016. The processor 2012 may be configured to implement the proposed procedures and/or methods of the present invention. The memory 2014 is connected to the processor 2012 to store various kinds of information related to operation of the processor 2012. The RF unit 2016 is connected to the processor 2012 and is configured to transmit and/or receive a radio signal. The UE 2020 includes a processor 2022, a memory 2024 and an RF unit 2026. The processor 2022 may be configured to implement the proposed procedures and/or methods of the present invention. The memory 2024 is connected to the processor 2022 to store various kinds of information related to operation of the processor 2022. The RF unit 20216 is connected to the processor 2022 and is configured to transmit and/or receive a radio signal. the BS 2010 and/or the UE 2020 may have a single antenna or multiple antennas.

In the embodiments described above, elements and features of the present invention are combined in a predetermined form. The elements or features should be considered optional unless explicitly mentioned otherwise. Each of the elements or features can be implemented without being combined with other elements or features. In addition, some elements and/or features may be combined to configure an embodiment of the present invention. The sequence of the operations discussed in the embodiments of the present invention may be changed. Some elements or features of one embodiment may also be included in another embodiment, or may be replaced with corresponding elements or features from another embodiment. It is apparent that some claims for which the relationship of dependency therebetween is not explicitly stated may be combined to configure an embodiment or may be incorporated into a new claim through amendment after filing of this application.

In this specification, embodiments have been described, focusing transmission and reception between UEs and a BS. This transmission and reception relationship may be extended to signal transmission and reception between a UE and a relay, or between a BS and a relay in the same/similar manner. In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term 'BS' may be replaced with the term 'fixed station', 'Node B', 'evolved Node B (eNode B or eNB)', 'Access Point (AP)', etc. The term 'terminal' may be replaced with the term 'user equipment (UE)', 'Mobile Station (MS)', 'Mobile Subscriber Station (MSS)', etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, an embodiment of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The embodiments of the present invention as described above are applicable to various mobile communication systems.

The invention claimed is:

1. A method for a user equipment (UE) operating in a wireless communication systems supporting a Device-to-Device (D2D) link, the method comprising:

receiving D2D synchronization configuration information including an identifier of a reference cell from a serving cell, wherein the reference cell is one of a number of neighboring cells;

acquiring a synchronization resource of the reference cell based on the D2D synchronization configuration information; and receiving a D2D signal through the D2D link based on the synchronization resource of the reference cell, wherein the D2D signal is received within a predetermined range with respect to the synchronization resource of the reference cell.

2. The method according to claim 1, wherein the D2D synchronization configuration information includes offset information used for the D2D link.

3. The method according to claim 2, wherein the offset information indicates a subframe used for the D2D link.

4. The method according to claim 3, wherein the subframe indicated by the offset information corresponds to a start subframe used for the D2D link.

5. A user equipment (UE) in a wireless communication system supporting a Device-to-Device (D2D) link, the user equipment comprising:
 a receiver; and
 a processor, connected with the receiver, that:
  controls the receiver to receive D2D synchronization configuration information including an identifier of a reference cell from a serving cell, wherein the reference cell is one of a number of neighboring cells;
  acquires a synchronization resource of the reference cell based on the D2D synchronization configuration information, and
  controls the receiver to receive a D2D signal through the D2D link based on the synchronization resource of the reference cell,
 wherein the D2D signal is received within a predetermined range with respect to the synchronization resource of the reference cell.

6. The UE according to claim 5, wherein the D2D synchronization configuration information includes offset information used for the D2D link.

7. The UE according to claim 6, wherein the offset information indicates a subframe used for the D2D link.

8. The UE according to claim 7, wherein the subframe indicated by the offset information corresponds to a start subframe used for the D2D link.

* * * * *